(12) United States Patent
Haase

(10) Patent No.: US 11,442,496 B2
(45) Date of Patent: Sep. 13, 2022

(54) FIELDBUS TRANSMITTER INTERFACE, FIELDBUS RECEIVER INTERFACE AND SYSTEM WITH BOTH INTERFACES AND CODING METHOD FOR A FIELDBUS TRANSMITTER INTERFACE

(71) Applicant: Endress+Hauser Conducta GmbH+Co. KG, Gerlingen (DE)

(72) Inventor: Björn Haase, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 17/216,841

(22) Filed: Mar. 30, 2021

(65) Prior Publication Data

US 2021/0311520 A1    Oct. 7, 2021

(30) Foreign Application Priority Data

Apr. 2, 2020   (DE) .................... 10 2020 109 234.2

(51) Int. Cl.
| | |
|---|---|
| *G06F 1/10* | (2006.01) |
| *G06F 13/42* | (2006.01) |
| *G06F 13/28* | (2006.01) |
| *H04L 12/40* | (2006.01) |
| *H04L 67/12* | (2022.01) |

(52) U.S. Cl.
CPC ............... *G06F 1/10* (2013.01); *G06F 13/28* (2013.01); *G06F 13/4213* (2013.01); *H04L 12/40* (2013.01); *H04L 67/12* (2013.01); *H04L 2012/4026* (2013.01)

(58) Field of Classification Search
CPC ........ G06F 1/10; G06F 13/28; G06F 13/4213; H04L 12/40; H04L 67/12; H04L 2012/4026; H04L 25/4902; Y02D 10/00
See application file for complete search history.

(56) References Cited

U.S. PATENT DOCUMENTS

| | | | | |
|---|---|---|---|---|
| 8,885,760 | B2* | 11/2014 | Haase | H03M 3/438 |
| | | | | 375/295 |
| 10,103,744 | B1* | 10/2018 | Gutta | H03M 3/32 |
| 2009/0168857 | A1 | 7/2009 | Golborne et al. | |
| 2012/0020430 | A1 | 1/2012 | Haase et al. | |
| 2018/0150094 | A1* | 5/2018 | Conroy | G05F 1/66 |
| 2019/0278246 | A1* | 9/2019 | Gopisetti | G06F 11/202 |

* cited by examiner

*Primary Examiner* — Glenn A. Auve
(74) *Attorney, Agent, or Firm* — Mark A. Logan; Endress+Hauser (USA) Holding Inc.

(57) ABSTRACT

Disclosed is a fieldbus transmitter interface for a field device or a control center. The fieldbus transmitter interface comprises a computing unit, a digital gate, an analog transmission filter and a transmitter interface output. The computing unit is connected to the digital gate, and the digital gate is connected to the analog transmission filter, and the analog transmission filter is connected to the transmitter interface output. The computing unit comprises a pulse width modulator and a pulse width modulator clock that is suitable for generating a secondary signal coded by a duty cycle which is varied over time by the pulse width modulator clock. The pulse width modulator superimposes the secondary signal with a carrier signal, so that a digital transmission signal with a frequency of less than 150 kHz is generated. The digital gate and the analog transmit filter convert the digital transmission signal into an analog loop signal.

21 Claims, 26 Drawing Sheets

Rounding method

<u>State: Two 32 bit accumulators representing signed integers</u>

```
int32_t accu1; // First order integrated error
int32_t accu2; // Second order integrated error
int32_t accu3; // Third order integrated error
```

<u>Input: unrounded 32 bit value</u>

```
int32_t unroundedValue;
```

<u>Output: rounded value, e.g. 8 bits</u>

```
int8_t roundedResult;
```

<u>State-modifying Algorithm / Digital circuit
for the rounding operation, first order</u>

```
accu1 += unroundedInputValue;
roundedResult = (accu1 >> 16) << 16;
accu1 -= roundedResult;
```

<u>State-modifying Algorithm / Digital circuit
for the rounding operation, second order</u>

```
accu1 += unroundedInputValue;
accu2 += accu1;
roundedResult = (accu2 >> 16) << 16;
accu1 -= roundedResult;
accu2 -= roundedResult; // Direct feedback to second integrator!
```

<u>State-modifying Algorithm / Digital circuit
for the rounding operation, third order</u>

```
accu1 += unroundedInputValue;
accu2 += accu1;
accu3 += accu2;
roundedResult = (accu3 >> 16) << 16;
accu1 -= roundedResult;
accu2 -= roundedResult; // Direct feedback to second integrator!
accu2 -= roundedResult; // Direct feedback to third integrator!
```

Fig. 14

FIELDBUS TRANSMITTER INTERFACE, FIELDBUS RECEIVER INTERFACE AND SYSTEM WITH BOTH INTERFACES AND CODING METHOD FOR A FIELDBUS TRANSMITTER INTERFACE

CROSS-REFERENCE TO RELATED APPLICATION

The present application is related to and claims the priority benefit of German Patent Application No. 10 2020 109 234.2, filed on Apr. 2, 2020, the entire contents of which are incorporated herein by reference.

TECHNICAL FIELD

The present disclosure relates to a fieldbus transmitter interface, a fieldbus receiver interface, a system with both interfaces, a coding method for a fieldbus transmitter interface.

BACKGROUND

In industrial plants in the field of process analysis, field devices are used to measure various parameters of a chemical process, for example, by means of measuring electronics present in the field device. The field devices communicate the measured parameters to control centers for analyzing and monitoring the processes. A standardized communication system for developing industrial fieldbuses, known as HART (Highway Addressable Remote Transducer), is used for the communication between the field devices and control centers.

HART facilitates the digital communication of a plurality of field devices via a common data bus. In order for the field device and the control center to be able to transmit and receive data via HART, both must each comprise a fieldbus interface. The fieldbus interface enables digital/analog hybrid communication between the field device and the control center. FIGS. 1 and 2 show an analog signal in an analog band AB for analog communication, for example between 4 mA and 20 mA, and a digital signal in a digital band DB for digital communication, for example between 1200 and 2200 Hz. The analog signal indicates the measured value of the sensor, for example. The digital signal indicates sensor-specific device information, for example.

For such hybrid communication, an asynchronous serial interface is used that, with a baud rate of 1200 BAUD for example, codes information, such as start bit, stop bit, data bits and parity bits (see digital signal in FIG. 3, broken line). Such a coded signal is referred to as a digital UART signal.

For hybrid communication, a coding corresponding to the digital UART signal is used based on "frequency shift keying," referred to as FSK method for short, which switches between higher and lower carrier frequencies when the phase position is maintained during a level change in the digital signal, as represented by the one analog sinusoidal signal in FIG. 3 (unbroken line). Carrier frequencies 1200 Hz and 2200 Hz are often used. For the purpose of simplification, in this document we refer to such frequency-modulated signal as a sinusoidal signal or carrier signal. For FSK-coded UART signals that comply with the HART fieldbus standard, it is important that the phase of the analog sinusoidal signal has to be continued steadily during the frequency change or data bit change and must not be distorted. This means that there must be no jumps in the signal profile of the analog signal and phase shifts in the signal during a frequency change must be avoided.

As a rule, the field device has two lines that form a current loop and are used for data transmission with the control center and possibly for energy supply (so-called two-wire devices). In some cases, the power supply and data transmission take place via separate current loops. In these cases, a first current loop is used for power supply and a separate current loop is used for data transmission (so-called four-wire devices).

In so-called intrinsically safe field devices, which are used in a potentially explosive area, the energy supply and the data transmission often take place via only one current loop, that is to say via only two lines, for safety reasons. The power available for operation in such a field device is, inter alia for safety reasons, severely restricted, specifically to a typical maximum of approximately 40 mW.

In addition to the circuit for controlling the interface, field bus devices as a rule have so-called microcontroller modules, which prepare the digital data for hybrid communication via the fieldbus interface for the transmitting and receiving operation. As a rule, such microcontrollers are not designed specifically for such fieldbus task and typically do not allow a direct connection to the circuit of the fieldbus interface on the so-called "physical layer," that is to say they do not include hardware modules specifically designed to output the HARD UART data signal in its analog form (FSK coded). As a rule, hardware components, which can generate and read the UART signal in its digital form, so-called UART interfaces, are also present. As a rule, for example, no demodulator or modulator circuit, which would be suitable for generating or decoding 1200 Hz/2200 Hz FSK sinusoidal signals and which can be connected to a UART, is provided in the microcontrollers as hardware, for example.

In fieldbus standards, as a rule, a distinction is made in compliance tests between "physical layer" tests and software protocol tests, wherein the "physical layer" tests include all electrical measurements, especially, the analog-coded waveform of the UART signal in its FSK embodiment.

Known fieldbus interfaces use a dedicated modem circuit or a circuit within a programmable logic chip (e.g., a so-called field programmable gate array, also called FPGA) for coding/decoding the HART fieldbus signals.

The latter solutions (e.g., FPGA) often have a high energy requirement. Solutions based on a modem circuit typically require a high number of digital data lines for various signals, such as a carrier detection signal (also called CD) for processing the analog FSK signal, a loop signal, an activation signal for the transmission electronics, etc., and thereby possibly increase the number of optocouplers or digital transmitters required. Thus, under certain circumstances, the limited energy requirement of 40 mW in field devices for the potentially explosive area cannot be maintained. Another drawback associated with the use of a specific modem chip or a programmable logic circuit (e. g., FPGA) is the high cost associated therewith.

Many, but not all microcontrollers are able to generate analog output signals by means of a digital-analog converter, provided that a corresponding control, for example a sinusoidal signal, is used. A disadvantage connected with the use of a HART transmission circuit, however, is that such hardware components in the microcontroller as a rule have a considerably higher current requirement for the output of an analog output signal than for the output of a digital logic signal. The reason is, as a rule, that the current requirement for analog driver stages must be taken into account for an analog output signal.

Virtually all microcontrollers in the prior art, however, include so-called PWM units for pulse-width modulation (referred to as PWM for short), which can be used to generate a digital output signal with parameterizable duty cycle. The duty cycle in this case denotes the ratio of the durations of the dwell times of the digital transmission signal at levels 1 and 0.

Such pulse width modulators have in common the fact that they are operated with a base clock of, for example, 8 MHz. The base clock is often identical to the clock frequency of the central processing unit (referred to as CPU) of the microcontroller. As a rule, microcontrollers also have a counter with a maximum value M. The output value of the counter is increased or decreased with the clock frequency of the base clock, which is predetermined by a counting direction of the counter. When the maximum value M is reached, the counting direction is typically changed or the counter value is reset to zero. The maximum value M thus parameterizes a division factor N.

As a rule, pulse width modulators furthermore contain a comparison unit, which compares the size of the output value of the counter with a comparison value V. Depending on the result of the comparison, a logic line may be selectively set to a 1 level or a 0 level.

Depending on the parameterized division factor N, in combination with the comparison value V, this results in a digital output signal, whose duty cycle is set by the comparison value V relative to the maximum value M and whose frequency is defined by the base clock and the division factor N.

The settings for the pulse width modulator which define the duty cycle are summarized below under the term "duty cycle parameterization." In many applications, a constant division factor N is used and the duty cycle parameterization is performed by programming the comparison value V.

It should be noted that the duty cycle in pulse width modulators is typically only adjustable in discrete stages. A fine-granular parameterization of the duty cycle in stages of 0 . . . N (with a given division factor N) requires a high division factor N and thus a low PWM output clock frequency.

In this point, pulse width modulators differ, for example, from sigma-delta modulators, such as can easily be realized, for example, in FPGA.

For field devices with hybrid communication according to the HART standard, in addition to the UART communication coded via the FSK signal, a purely analog transmission of a data signal also takes place, for example via a loop current between 4 and 20 mA in the analog band (see FIGS. 1 and 2).

For this purpose, conventional field devices have a circuit for a current loop interface, as outlined in FIG. 4. The current loop interface has, for example, inter alia, the task of combining the analog signals output by a HART modem circuit, for example as a voltage-coded FSK sinusoidal signal with levels between e.g. −0.5 V and +0.5 V, with a signal which codes the desired loop direct current (e.g. 0.4 V for 4 mA) and converts it into a loop current with a current source/current sink in a loop current of, for example, 4 mA direct current +/−0.5 mA FSK sinus.

On the receiving side, the task of the circuit of the current loop interface circuit is to convert the voltages and currents measured at the two conductors of the current loop into a low frequency analog signal and an analog FSK received signal, each with voltage signal levels adapted for the HART modem, for example.

A HART communication system is carried out between at least two remote stations, e.g. a control center S2 and a sensor field device S1 (see FIG. 5), which are each given a master or slave role in the communication protocol and therefore have slightly differently designed current loop interface circuits. In particular, as a rule, they have different output impedances at the current loop terminals. For example, a distinction is made between low impedance devices where the control center is HART master and high impedance devices where a sensor is HART slave. Details of this can be found, inter alia, in the specification of the HART fieldbus interface or in example circuits for low and high impedance devices as specified by manufacturers of HART modems in the respective data sheets.

Current loop interfaces are used in the field device to convert the signals between the current loop and the HART modem (see FIG. 4). For example, a HART modem outputs the FSK sinusoidal signal as a voltage signal with an amplitude of +/−1 V level, which is converted in the current loop interface for a high impedance (slave) device to a modulation current of +/−0.5 mA in the current loop. In many cases, the circuit of the current loop interface in the field device is, for reasons of electromagnetic compatibility (EMC), galvanically separated from the measuring electronics present in the field device, especially, in the case of sensors. In this case, signals for controlling the digital fieldbus interface must be directed via a galvanic barrier, for example with expensive optocouplers or digital transmitters, which often have a high current requirement. In addition, the control signals of the fieldbus interface should preferably be transmitted with only digital coding via galvanic barriers, since the control signals in analog coding are exposed to greater tolerances and more drift by an optocoupler than in digital coding and thus the control signals can be distorted more easily in analog coding. The transmission of analog voltage-coded FSK HART signals with a sinusoidal profile can therefore often not be transmitted via a galvanic barrier without significant additional effort.

A disadvantage when using a HART modem is that a greater number of control lines is, as a rule, required to digitally control it, as illustrated schematically in FIG. 4. For example, five digital signals are necessary for the digital UART signal: Transmit and receive direction (RXD, TXD), receive carrier signal detection (CD), transmit carrier activation (Carrier On) and modem activation (Enable). Such digital signals must in each case be transmitted via the galvanically separated barrier. In addition, the signals required for the direct decoding and the direct current coding for the low-frequency components of the hybrid method are optionally to be taken into account. These too often have to be transmitted via a galvanic barrier.

In the prior art, for example in patent specification EP 2412135 B1, a solution is described, which considerably reduces the number of signals to be transmitted via the galvanic barrier and transmits them together with a coding method on a digital signal line in each case for the transmit and receive direction, that is to say both the low-frequency current loop signal and the higher frequency FSK UART signal (transmit bit stream and receive bit stream). The transmit bit stream is transmitted to a transmission circuit (optionally by means of a galvanic barrier) and supplied there to a gate, the output of which is passed on to an analog filter. The hybrid HART transmission signal already combined then results at the output of such analog filter. The HART transmission signal comprises the low-frequency signal, which codes the direct component and the analog FSK transmission signal. The low-frequency signal and the FSK transmission signal can thus be supplied jointly to the circuit of the current loop interface.

However, the coding and decoding methods described in EP 2412135 B1 require high computing powers, such as are available, for example, in a programmable logic device (e.g., FPGA), but not under the boundary conditions of highly restricted electrical supply power, such as are present, inter alia, in the case of explosion-protected, intrinsically safe two-wire field devices.

In particular, according to the method of EP 2412135 B1, the level changes in the transmit bit stream occur at a high frequency, for example significantly more than 150 kHz. It is proposed in EP 2412135 B1 to calculate such bit stream via a sigma-delta modulator with a 1-bit output (single bit sigma-delta modulator), wherein the 1-bit output directly forms the transmit bit stream. For practical reasons, this method cannot be applied when using conventional low power microcontrollers because, on the one hand, the pulse width modulators integrated there are not capable of generating the sigma-delta-modulated 1-bit data stream and, on the other hand, the computing powers required would be much too high for a purely software-based solution.

The level of the frequency of the level changes or the oversampling rate in the transmit bit stream is important for the function, since this determines how strongly the FSK signal is distorted by digital noise during the coding.

EP 2412135 B1 describes in particular a method for using a second order 1-bit sigma-delta modulator, which can advantageously be used to increase noise interference signals in the transmit bit stream, even with a comparatively low sampling rate, far beyond the filter cutoff frequency of the analog filter (see EP 2412135 B1; FIG. 6; filter "F"), so that they are sufficiently attenuated.

To test compliance with the HART field bus standards, the output of the current loop device is evaluated via a normatively fixed analog filter having a transmission characteristic as shown in FIG. 6. Such filter has a passband of between about 500 Hz and 5 kHz and attenuates frequency components of, for example, 10 kHz and 20 kHz only slightly. The use of a high oversampling rate ensures that only small interference signal amplitudes are contained in the filtered transmit bit stream in such critical frequency range.

EP 2412135 B1 already states, inter alia: "In order not to limit the frequency range of the alternating current signal, the cut-off frequency of the low-pass filter may be set higher than the frequency of the alternating current signal to be set in the current loop. The frequency range of the alternating current signal is then not suppressed by the low-pass filter— instead, only noise resulting from frequencies that are greater than those of the alternating current signal is suppressed (see EP 2412135 B1; para. [0051])". Furthermore, the technical solution is described there, which defines the required frequencies for the purpose of sufficient noise suppression in the useful band: "On the other hand, a sufficient so-called oversampling rate is required. [ . . . ] If an oversampling rate of at least 64 and a useful frequency of at most 5 kHz is used, a reasonable minimum value of around 300 kHz results for the clock CLK. A frequency between 200 kHz and 4 MHz is thus advantageously used for the clock CLK" (see EP 2412135 B1; para. [0091]).

The requirement for a high oversampling frequency exists both in the transmit and in the receive direction. On the receiving side, the challenge is to perform low-pass filtering at a bit-stream frequency above 200 kHz within the framework of a multistage so-called CIC filter (see EP 2412135 B1, FIG. 18). In particular, the computing operations of the first three filter stages of the CIC filter for processing the 1-bit input data stream must be performed at the bit-stream frequency, i.e. at 200 kHz, for example. However, such computing operations significantly exceed the performance of low power microcontrollers within the scope of a software solution. The solution of EP 2412135 B1 can thus also not be used on the receiving side under the boundary condition of greatly limited power, as is the case when used in potentially explosive areas.

SUMMARY

Therefore, it is an object of the present disclosure to provide a device that enables maximum data transmission via a current loop using minimum electrical energy.

The fieldbus interface for a field device or a control center according to the present disclosure comprises a computing unit, a digital gate, an analog transmission filter and a transmitter interface output. The computing unit is connected to the digital gate, and the digital gate is connected to the analog transmission filter, and the analog transmission filter is connected to the transmitter interface output. The computing unit comprises a pulse width modulator and a pulse width modulator clock, which is suitable for generating a secondary signal, which is coded by means of a duty cycle that is varied over time by the pulse width modulator clock, and the pulse width modulator is suitable for superimposing the secondary signal with a carrier signal, so that a digital transmission signal with a frequency of less than 150 kHz is generated.

The digital gate and the analog transmit filter are suitable for converting the digital transmission signal into an analog loop signal. The transmitter interface output is suitable to be connected to a remote station for transmitting the analog loop signal to the remote station.

An advantage of the device according to the present disclosure is in the realization of an efficient and secure data transmission between field device and control center with low energy. It is also possible to dispense with expensive specific logic devices, such as FPGAs, thereby reducing the overall costs of a system equipped with the device according to the present disclosure. The low oversampling rate results in lower computing power requirements for generating the transmit bit stream, making the method practicable even for low-power applications. The device according to the present disclosure makes it possible to dispense with computationally complex CIC decimation filters. A cost-effective fieldbus interface is thus made possible, which has low computing power and energy requirements. Furthermore, in the case of a transmission via a galvanic barrier, the number of digital control lines is minimized and specific modem circuits or programmable logic circuits are dispensed with, as a result of which the device can also be used for low-power applications.

According to one embodiment of the present disclosure, the fieldbus transmitter interface further comprises a first galvanic barrier, which is arranged between the computing unit and the digital transmit filter.

According to one embodiment of the present disclosure, the computing unit has a duty cycle modulator for rounding an input value, which is suitable for converting the input value into duty cycle setpoint values rounded for the respective periods of the digital transmission signal and for transmitting the rounded duty cycle setpoint values to the pulse width modulator.

According to one embodiment of the present disclosure, the duty cycle modulator is a multi-bit sigma-delta modulator. The duty cycle modulator is, especially, a second-order multi-bit sigma-delta modulator.

According to one embodiment of the present disclosure, the computing unit determines the unrounded input value for the duty cycle modulator based on a direct current voltage setpoint value and a sinusoidal setpoint value. Preferably from a sum of the direct current voltage setpoint value and the sinusoidal setpoint value.

According to one embodiment of the present disclosure, the computing unit has a slew rate limiter, which is suitable for limiting a change in the direct current voltage setpoint values.

According to one embodiment of the present disclosure, the pulse width modulator codes the secondary signal at a baud rate of 1200 Hz. The period duration of the secondary signal is constant and the frequency of the digital transmission signal is an integer multiple of the baud rate, especially, 15 times to 125 times the baud rate.

According to an embodiment of the present disclosure, the computing unit comprises a sinusoidal pre-distortion filter. The sinusoidal pre-distortion filter is suitable for implementing a frequency-dependent phase shift of the digital transmission signal, in order to compensate for a phase shift of the analog transmit filter.

According to one embodiment of the present disclosure, the computing unit comprises a sine generator, which is suitable for outputting a sine value from a phase input value and forwarding it to the duty cycle modulator, so that the sine value includes a pre-distortion, which is suitable for compensating for a predetermined frequency-dependent phase shift of the analog filter.

According to one embodiment of the present disclosure, the computing unit further comprises a memory and a direct memory access controller. A duty cycle sequence is stored in the memory, and the direct memory access controller is suitable for controlling the pulse width modulator with the duty cycle sequence in such a way that it adjusts the duty cycle as a function of the duty cycle sequence.

According to one embodiment of the present disclosure, the analog transmit filter is at least third order and is optimized, especially, for low phase shift in the useful frequency band and has, especially, a Bessel or Butterworth characteristic or a plateau characteristic.

The fieldbus receiver interface according to the present disclosure for processing a primary signal comprises a receiver interface input, a first analog pre-filter, a second analog pre-filter, a computing unit with an analog digital converter, a direct current deduction filter and a quadrature demodulator.

According to one embodiment of the present disclosure, the fieldbus receiver interface further comprises a second galvanic barrier, which is arranged between the receiver interface input and the computing unit and is arranged between the first analog pre-filter and the second analog pre-filter.

According to one embodiment of the present disclosure, the primary signal is transmitted with digital coding via the second galvanic barrier.

According to one embodiment of the present disclosure, an analog sigma-delta modulator is used to convert an output signal of the second analog pre-filter.

According to one embodiment of the present disclosure, the primary signal to be decoded contains two carrier frequencies, especially, 1200 Hz and 2200 Hz, and the analog digital converter is controlled by the clock generator with an integer multiple of the center frequency of these two carrier frequencies, especially, at four times such center frequency, especially, at 6800 Hz.

The fieldbus interface according to the present disclosure comprises a fieldbus transmitter interface according to the present disclosure and a fieldbus receiver interface according to the present disclosure.

The system according to the present disclosure comprises a fieldbus transmitter interface according to the present disclosure and a fieldbus receiver interface according to the present disclosure. The fieldbus transmitter interface and the fieldbus receiver interface are connected to one another via a current loop.

The coding method according to the present disclosure for a fieldbus transmitter interface of a field device or of a control center comprises at least the following steps:
- provision of an interface transmitter fieldbus according to the present disclosure,
- generation of a digital representation of the secondary signal as a duty cycle sequence by the computing unit,
- transmission of the digital representation of the secondary signal to a pulse-width modulator,
- conversion of the digital representation of the secondary signal by the pulse width modulator into a digital transmitter signal with a duty cycle that varies over time and with a frequency of less than 150 kHz,
- generation of an analog loop signal by a digital gate based on the digital signal,
- provision of the analog loop signal at the transmitter interface output.

According to one embodiment of the present disclosure, in order to generate the duty cycle sequence a multi-bit sigma delta modulator is used, especially, a second-order sigma-delta modulator, especially, a sigma-delta modulator with two-stage feedback.

According to one embodiment of the present disclosure, a frequency-dependent pre-distortion of the phase of the digital transmission signal occurs when the duty cycle sequence is generated.

BRIEF DESCRIPTION OF THE DRAWINGS

The present disclosure will be explained in more detail on the basis of the following description of the figure. The following are shown:

FIG. 14 shows an exemplary embodiment for a rounding method;

DETAILED DESCRIPTION

Figure 1:
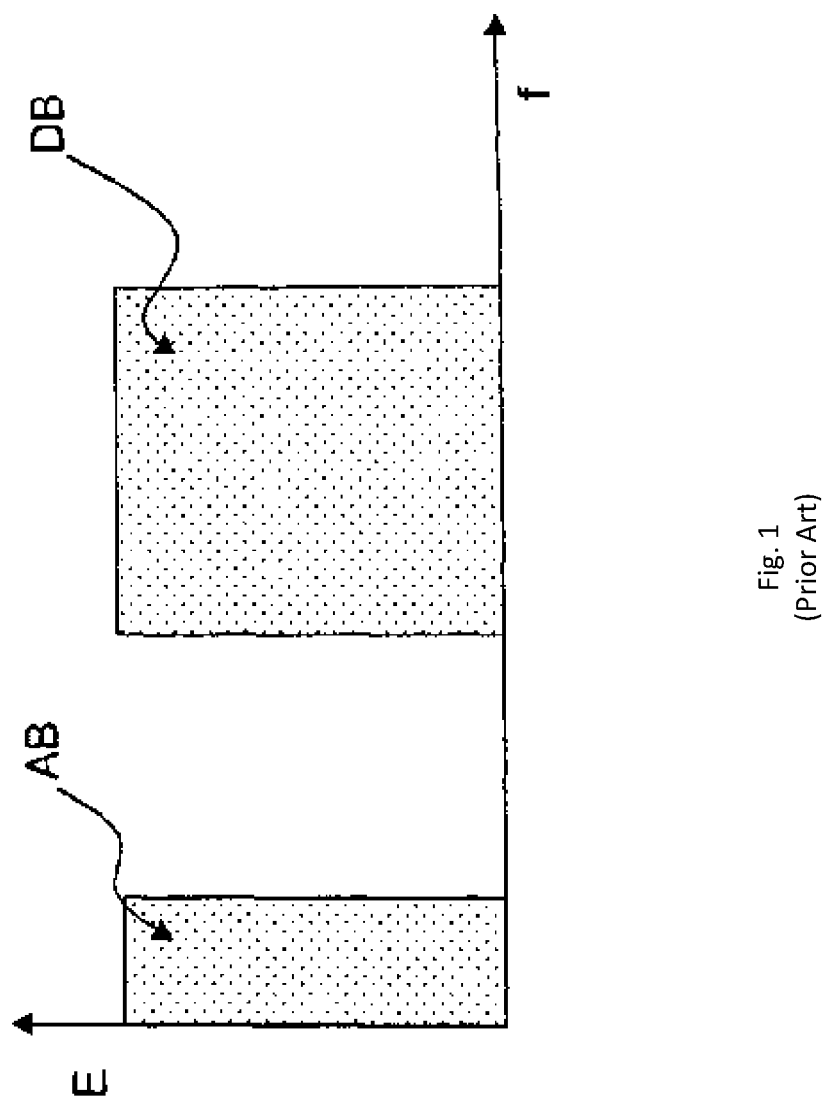
FIG. 1 shows a schematic representation of a signal for hybrid communication from the prior art according to the HART standard.
Figure 2:
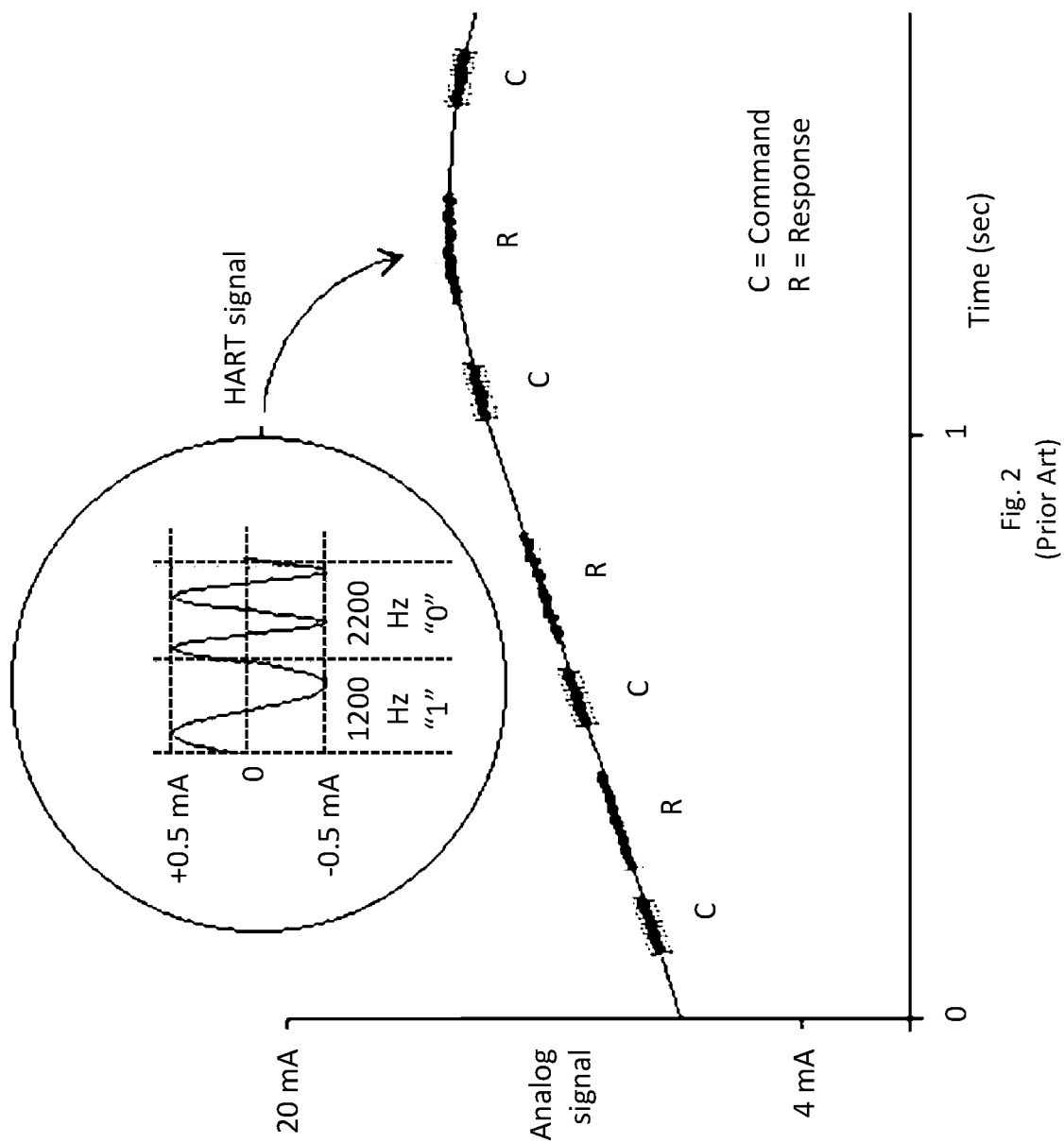
FIG. 2 shows a detailed representation of the signal from FIG. 1.
Figure 3:
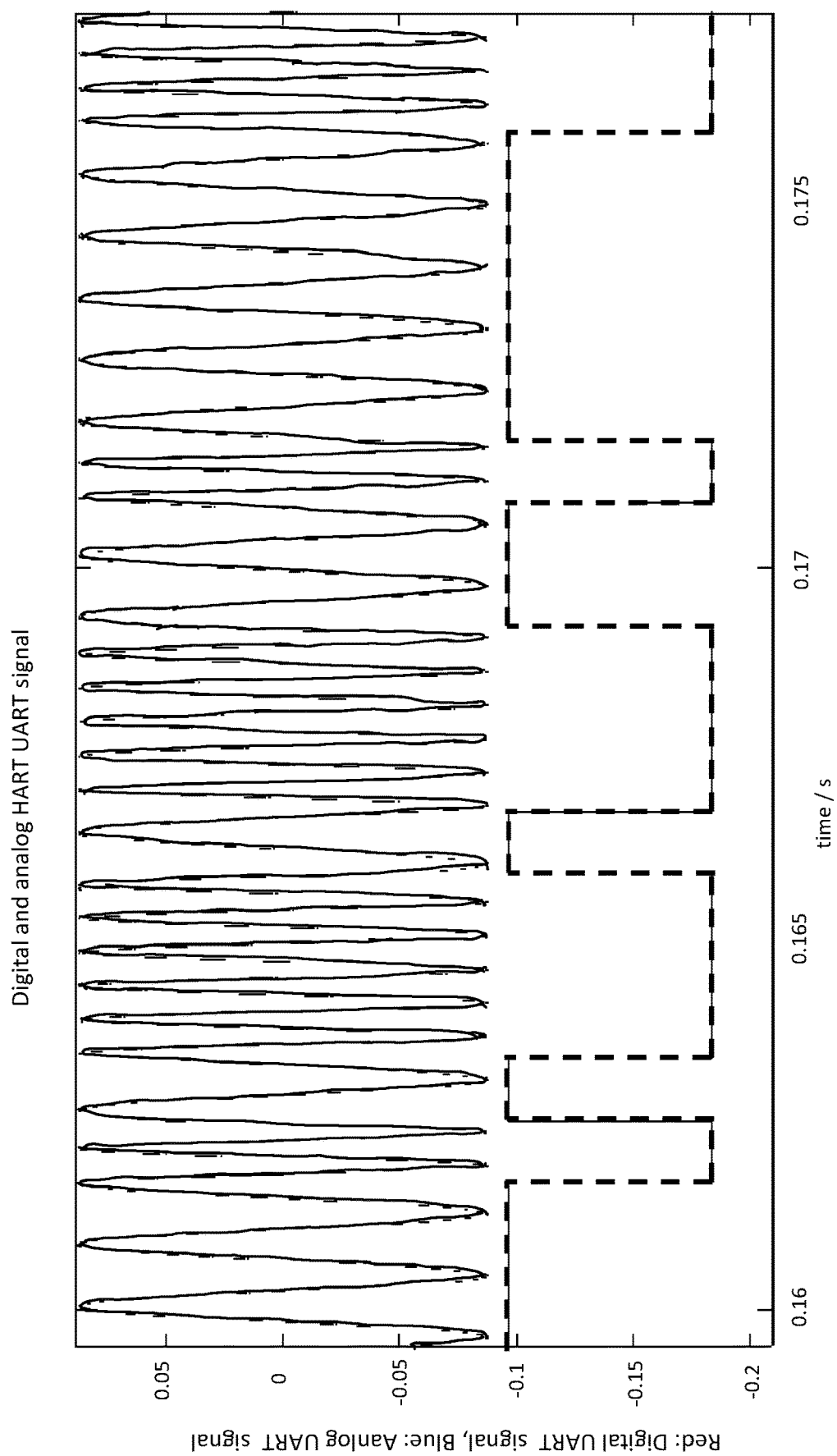
FIG. 3 shows an example of a digital UART signal and an associated FSK signal according to the prior art for a HART fieldbus communication.
Figure 4:
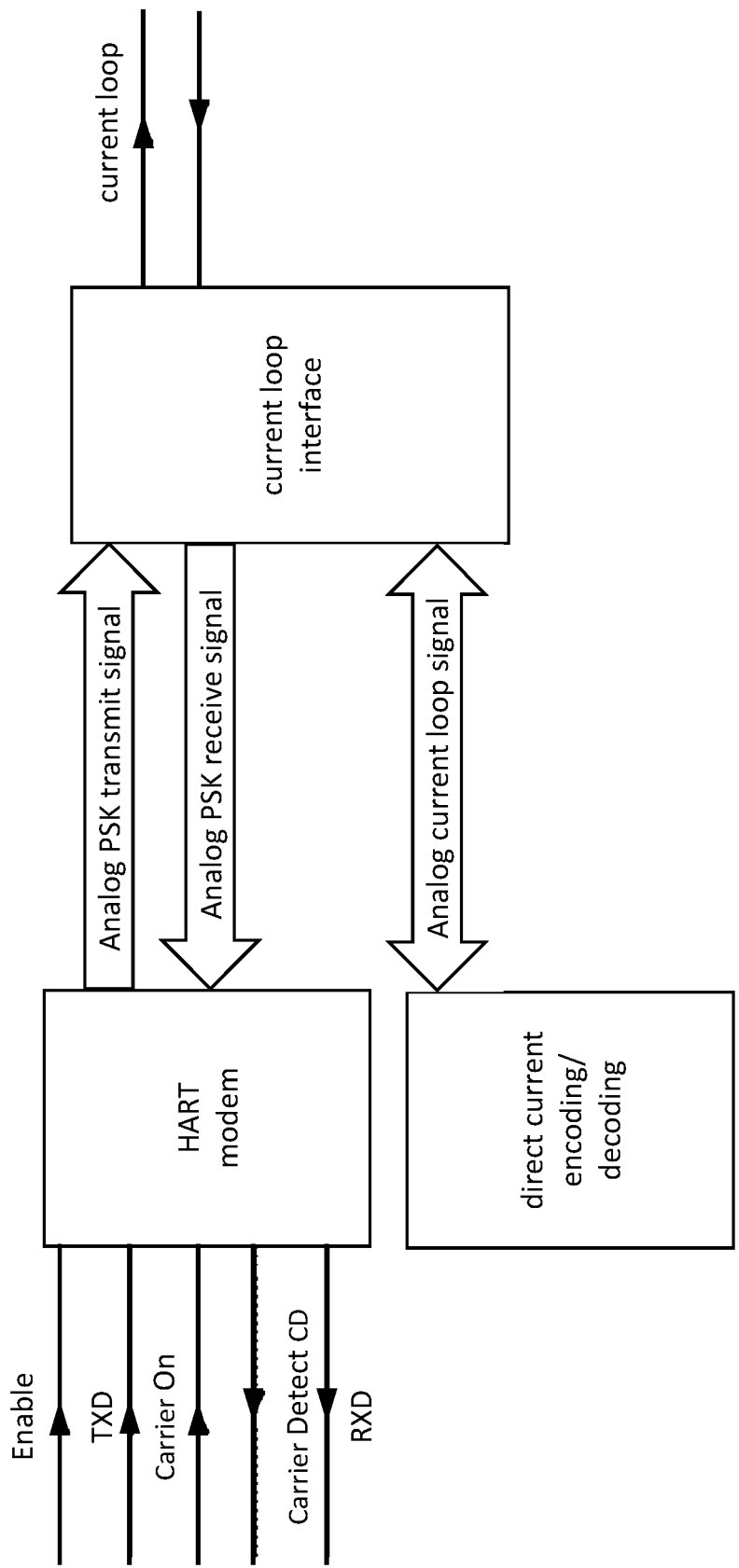
FIG. 4 shows a configuration known from the prior art for a HART fieldbus with a conventional HART modem.
Figure 5:
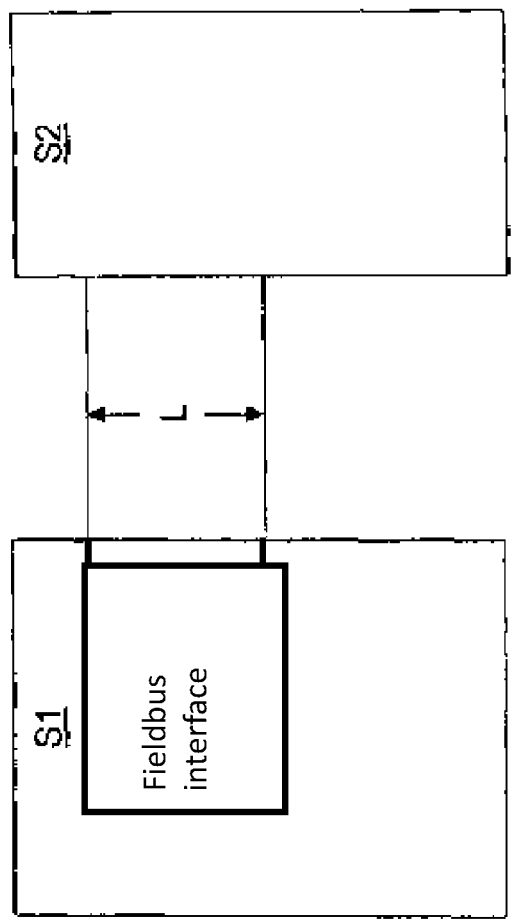
FIG. 5 schematically shows a current loop known from the prior art and connected to two fieldbus remote stations S1 and S2.
Figure 6:
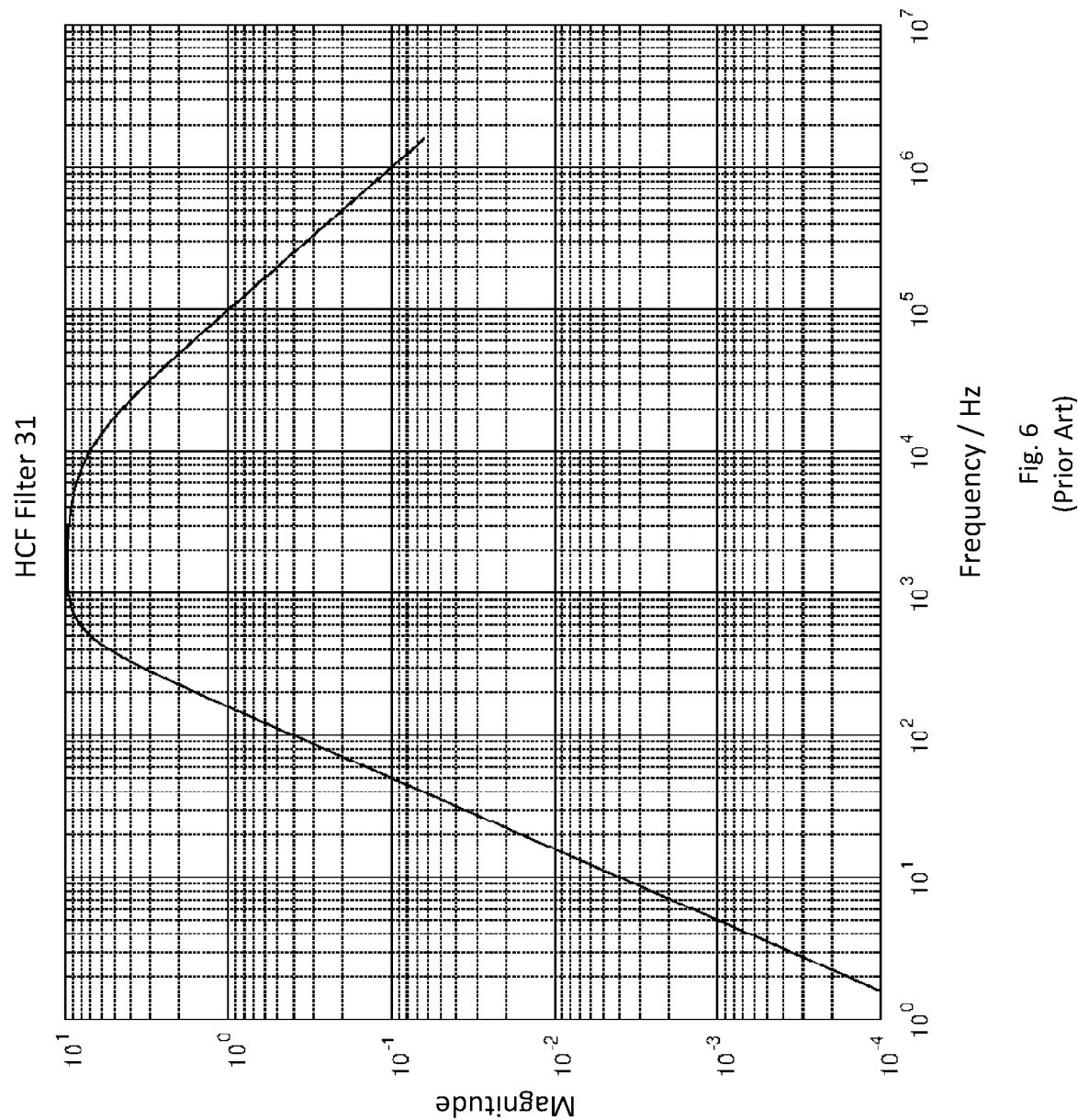
FIG. 6 shows an exemplary transmission characteristic of a filter for analyzing interference levels on HART fieldbuses of the prior art.
Figure 7:
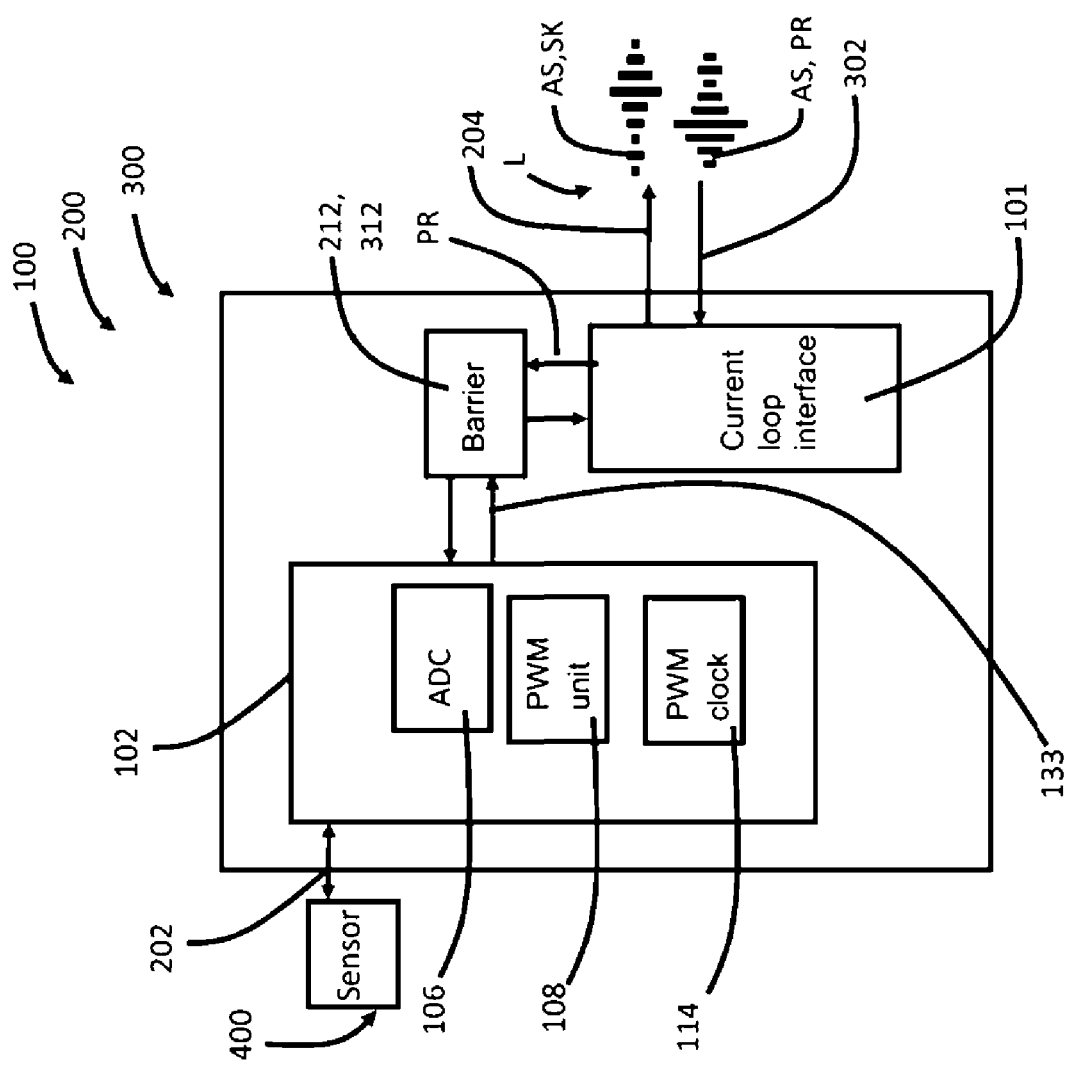
FIG. 7 shows an exemplary schematic embodiment of a fieldbus interface according to the present disclosure having a computing unit, a galvanic barrier and a current loop interface.

An exemplary embodiment of the present disclosure will be described in detail below. FIG. 7 shows an embodiment of a fieldbus interface 100 according to the present disclosure. Fieldbus interface 100 is understood here to mean a fieldbus transmitter interface 200 as a transmission channel and/or a fieldbus receiver interface 300 as receiving channel.

The present disclosure enables information to be coded and/or decoded onto a sinusoidal signal by means of FSK to form an FSK signal, in such a way that energy for coding and/or decoding is saved. The information to be transmitted in the FSK sinusoidal signal can be present as voltage, digital level or memory content.

Hereinafter, the term primary signal PR will refer to the FSK signals received from the fieldbus interface, and the term secondary signal SK will refer to the information transmitted by the fieldbus interface as the FSK signal. This applies irrespective of whether a sinusoidal profile of the FSK signals is present in a coding or decoding as current, voltage, temporal progression of digitized ADC data or as a temporal progression of a data bit.

The fieldbus interface 100 according to the present disclosure makes it possible that the primary signals PR and/or secondary signals SK can be advantageously coded/decoded at one point in the fieldbus interface 100 as a temporal progression of a data bit and thus advantageously can be transmitted via a first or second galvanic barrier 212, 312 with only one transmission of a single data level in each case. Thus, inter alia, the aforementioned multiplicity of input and output lines via a galvanic barrier is avoided.

The fieldbus interface 100 is connected, for example, to a sensor 400 and assumes the role of a HART slave. The fieldbus interface 100 can analogously also be used for a role as a HART master. HART slaves and HART masters differ in this case both with regard to their software interfaces and with regard to their hardware interfaces.

If the fieldbus interface 100 functions as a HART master, the fieldbus transmitter interface 200 has a current loop interface 101 with low output impedance and is suitable for coding the secondary signal SK via a modulation of the voltage present at the current loop interface 101. If the fieldbus interface 100 functions as a HART master, the primary signal PR is received via an evaluation of a modulation of the loop current.

Typically, each data transmission between the fieldbus interface 100 and an opposite side is initiated by a request message from the HART master to the HART slave.

In contrast, HART slaves have a current loop interface 101 with high output impedance and transmit the secondary signal SK via a modulation of the loop current. Primary signals PR of the HART master arriving at the HART slave are detected via a modulation of the voltage (primary signal) applied to the current loop interface 101. HART slaves typically wait for request messages from the master and answer them.

In the following, the present disclosure is described using the example of a measuring transducer, which functions as a HART slave, which transmits a secondary signal SK with measurement data of a sensor 400 back to the control center in response to a request message (primary signal PR) of a remote station, here a control center. Both pieces of information are coded as an analog loop signal AS for transmission in the current loop.

FIG. 7 shows two lines of a current loop L, which are connected to the current loop interface 101. In the illustrated example, the fieldbus interface 100 functions as a HART slave, and the current loop interface 101 has a high output impedance power source. The fieldbus interface 100 is connected to the two lines of the current loop L.

The sensor 400 is connected via a transmitter interface input 202 to a computing unit 102 of the fieldbus interface 100, for example a microcontroller. The measured value is thus transferred from the sensor 400 to the computing unit 102.

Figure 8:
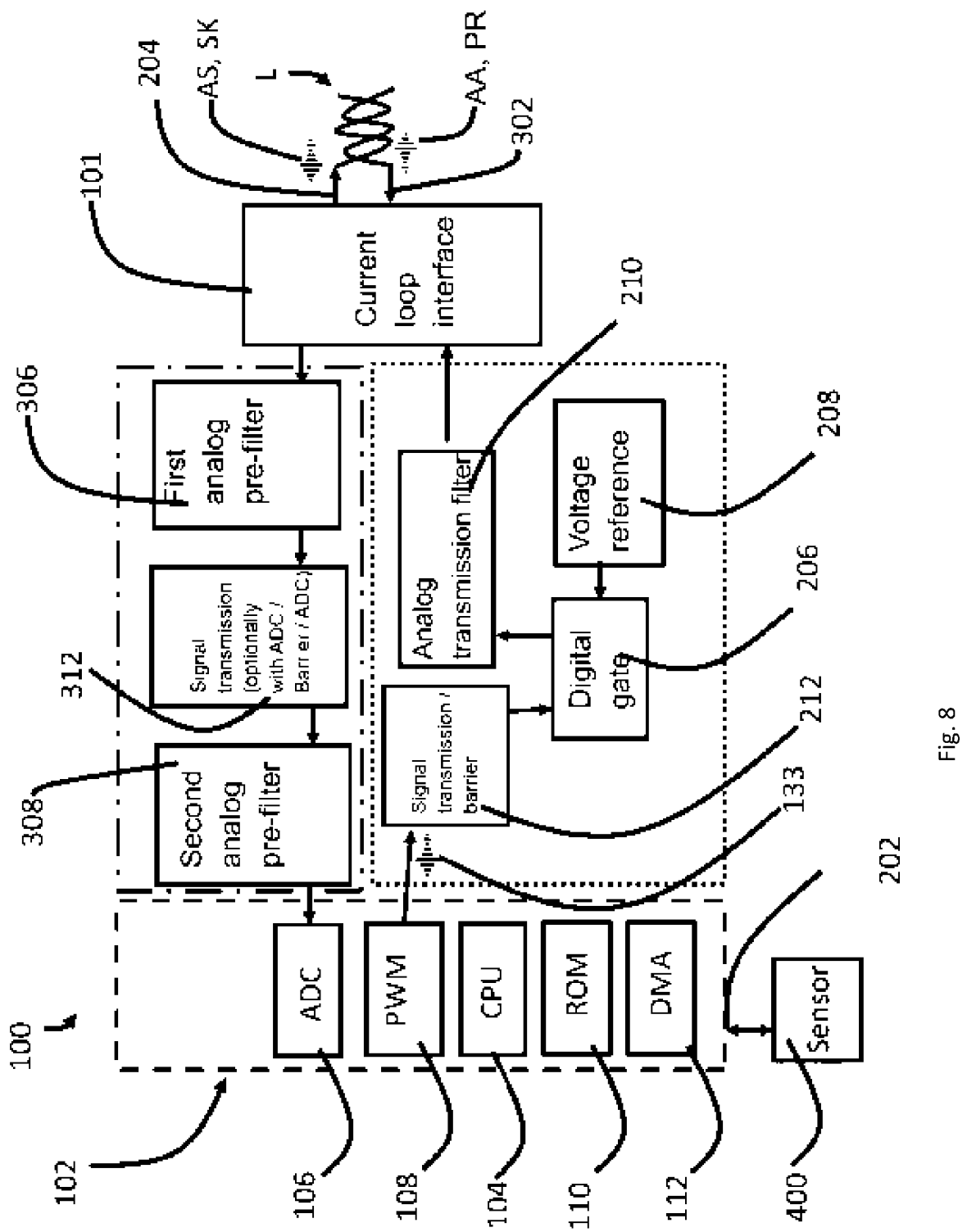
FIG. 8 shows a detailed schematic view of the fieldbus interface of FIG. 7.

In FIG. 8, the computing unit 102 is outlined as a block drawn in broken lines. Such computing unit 102 includes a processor 104 (also called a CPU), an analog-digital converter 106 (also called an ADC), a pulse width modulator 108 (also called a PWM) along with other components, such as a memory 110, for example a RAM memory and/or a ROM memory, and optionally a direct memory access controller 112 (also referred to as a DMA). The direct memory access controller 112 is suitable for addressing the analog-digital converter 106 and the pulse width modulator 108 without the cooperation of the processor 104.

The pulse width modulator 108 enables a duty cycle parameterization (N,n), comprising a division factor N and duty cycle value n from the set {0 . . . N−1} and a base operating frequency f_base for generating a digital PWM signal DTX, i.e. a digital transmitter signal 133, with a base frequency of f_PWM=f_base/N and duty cycle DR=(n/(N−1)), especially, with f_PWM in the range between 20 kHz and 200 kHz.

The sensor 400 and the computing unit 102 on the one hand and the current loop interface 101 on the other hand are optionally galvanically separated from one another. Such galvanic barrier is also referred to as first galvanic barrier 212 (see FIG. 7). Preferably, the first galvanic barrier 212 is arranged in the fieldbus interface 100 in such a way that signals are conducted from the computing unit 102 to the remote station via the first galvanic barrier 212. The first galvanic barrier 212 is, for example, an optocoupler or an inductive interface. The first galvanic barrier 212 enables the sensor 400 or the computing unit 102 to be protected against excessively high currents/voltages. Such protection is particularly important in potentially explosive areas.

FIG. 8 shows the fieldbus interface 100 with a fieldbus transmitter interface 200 and a fieldbus receiver interface 300. The elements that are associated only with the fieldbus transmitter interface 200 are outlined with a dotted line. The elements which are only associated with the fieldbus receiver interface 300 are outlined with a dash-dotted line.

It can be seen from FIG. 8 that the digital signal 133 is generated by the pulse-width modulator 108 in the transmitter direction of the fieldbus interface 100, that is to say by the fieldbus transmitter interface 200. Such signal codes the information of the secondary signal about the temporal progression of a single data bit. This data bit may be transmitted via a first galvanic barrier 212, more generally also referred to as signal transmission, and is provided to a digital gate 206. Such digital gate 206 is advantageously operated from a precise voltage reference 208. An output voltage generated by the digital gate 206 is then applied to an analog transmit filter 210. The digital gate 206 can thus be regarded as a 1-bit digital analog converter, which converts the digital signal 133 into a defined analog voltage curve. As an alternative to the use of digital gates 206, other suitable circuits, for example a discrete circuit based on field-effect transistors, can of course also be used to convert the data bit into an analog output voltage. The analog transmission filter 210 then assumes the task of converting such voltage curve in the circuit of the current loop interface 101 into an analog loop signal AS, that is to say a loop current of 4 mA to 20 mA plus an FSK signal of, for example: +/−0.5 mA amplitude.

FIG. 8 also shows that in the receive direction of the fieldbus interface 100, that is to say through the fieldbus receiver interface 300, a voltage present at the current loop L, that is to say an analog loop signal AS, is forwarded from the current loop interface 101 to a first analog pre-filter 306. In particular, the first analog pre-filter 306 suppresses frequencies of 500 Hz and less.

This first analog pre-filter 306 is connected to a second galvanic barrier 312, also referred to somewhat more generally as a signal transmitting circuit. The fieldbus interface 100 makes it possible to transmit the information of the primary signal PR in the receiving channel, that is to say in the fieldbus receiver interface 300, to the computing unit 102, optionally also by means of a second galvanic barrier 312.

Originally, the information of the primary signal PR is coded, for example, as an analog voltage. Transmission of this signal beyond the second galvanic barrier 312 can be effected, for example, by first converting the analog voltage into the temporal progression of a digital data bit, which is then transmitted via an optocoupler or the like. The conversion of an analog voltage into such a data bit can be effected by an analog sigma-delta modulator, such as is embodied, for example, in US20120020430A1. Such a conversion generates a progression of the data bit that varies over time.

After the transmission of the received signal as a data bit, the received signal is again converted into an analog signal (optionally by a digital gate) and the resulting voltage profile is processed in a second analog filter 308 (analogous to the procedure described above on the transmitting side, i.e. in the fieldbus transmitter interface 200).

In the filter 308, especially, interference frequencies outside the useful frequency band of 1200 Hz to 2200 Hz are suppressed.

If current loop interface and microcontroller are galvanically coupled, digitization of the received signal for transmission can also be dispensed with, and the two filter components 308 and 306 together with the second galvanic barrier 312 form an analog input filter.

The output signal of the second analog pre-filter 308 is provided to an analog-digital converter 106 within the computing unit 102 and further processed digitally.

The use of a second analog pre-filter 308 is also advantageous if the primary signal PR in the second galvanic barrier 312 is already digitally coded as a bit stream, because the filtering can optionally take place with an analog circuit with less energy requirement than with a digital filter algorithm.

After this overview description of the fieldbus interface 100, which jointly comprises the fieldbus transmitter interface 200 and the fieldbus receiver interface 300, the fieldbus transmitter interface 200 and the coding methods associated therewith are discussed in more detail below, which method as a result transmits the information of the secondary signal SK as an analog loop signal AS to the control center.

Preferably, data signals coming from sensor 400, for example, are first transmitted to computing unit 102. The data of the secondary signal SK are calculated therefrom in the computing unit 102 and coded by means of the pulse width modulator 108 as a temporal progression of a data bit.

In contrast to EP 2412135 B1, it is proposed not to carry out the conversion of the secondary signal to the temporal progression of a data bit by a 1-bit sigma-delta modulator with a high oversampling rate, but rather as a conventional PWM signal, that is to say as a digital transmission signal 133, as can be generated by the pulse width modulators 108 in commercially available microcontrollers.

In particular, it is proposed to operate at low frequencies f, that is to say from at most 20 kHz to at most 200 kHz, for example, of a logic level switch in the pulse width modulator 108. In the pulse width modulator 108, a low frequency corresponds to large PWM division values N.

Figure 9:
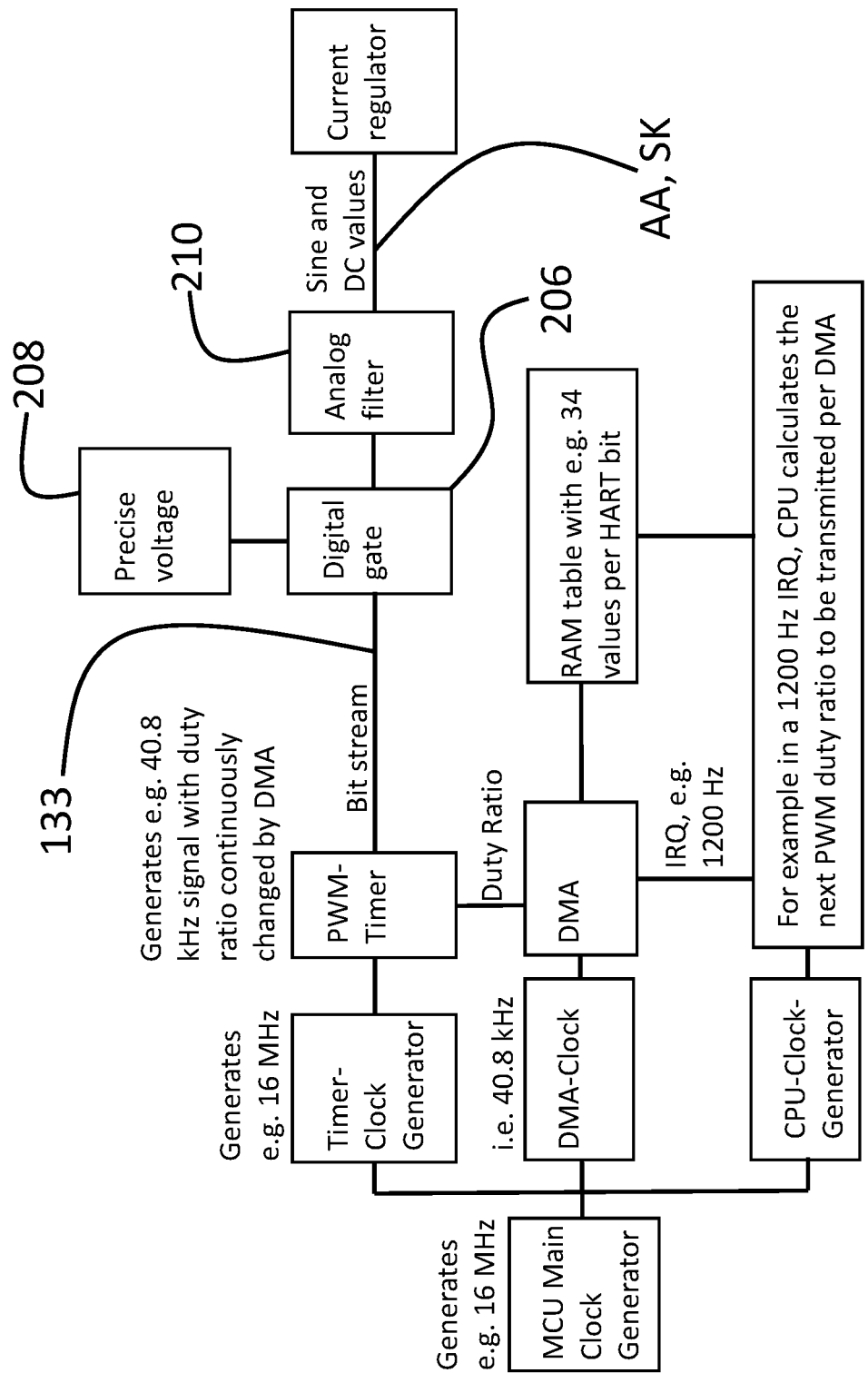
FIG. 9 shows a diagram of a fieldbus transmitter interface according to the present disclosure.

FIG. 9 shows an overview of the coding method used by the fieldbus transmitter interface 200. For example, a PWM clock of 40.8 kHz, 34 times the baud rate of 1200 Hz, is generated by a divider N=392 from a base clock of 16 MHz. For each PWM period of 40.8 kHz, a new duty cycle is calculated by a multi-bit sigma-delta modulator with output values between 0 and N−1=391 and configured in the pulse width modulator 108. For this purpose, the temporal progression of the sinusoidal secondary signal SK is stored, for example, in a table in the memory 110 of the microcontroller 102 as the desired temporal progression of the duty cycle and transmitted (e.g., with a DMA controller 112) to the PWM clock 114.

A 1-bit digital signal, the digital transmission signal 133 with a base frequency of 40.8 kHz and a duty cycle changed respectively per period are then output at the output of the PWM clock 114. This digital transmission signal 133 can be forwarded (optionally using optocouplers or separating transmitters via the first galvanic barrier 212) to a digital gate 206, for example from the 74LVC logic family. Such digital gate 206 is advantageously operated at its supply voltage input from a precise reference voltage source 208. The time-averaged direct current voltage value is then established as the product of the reference voltage with the mean value of the duty cycles. Since the duty cycles are purely digital signals for which tolerances almost need not be considered, the accuracy of the average analog voltage level at the output of the digital gate 206 is limited only by the tolerances of the reference voltage source 208. The output signal of the digital gate 206 is subsequently provided to the analog transmission filter 210. This analog transmission filter 210 generates a waveform that, in addition to the FSK sinusoidal signal, contains the desired direct current voltage level for the 4 . . . 20 mA direct current coding in the current loop L.

The fieldbus interface 100 makes it possible to convert the data of the secondary signal SK together with the data for the desired DC loop current into a temporal progression of the duty cycle of a pulse width modulator 108 and to transmit such duty cycle profile to the pulse width modulator 108 and to subsequently convert the digital transmitter signal 133 into the analog loop current AS in the current loop L.

The analog transmission filter 210 is advantageously designed as a low-pass filter of at least second order. The cut-off frequency of the analog transmission filter 210 is advantageously chosen between 4 kHz and 8 kHz. The analog transmission filter 210 preferably has a low-pass characteristic, especially, with a cut-off frequency of the stop band in the range from 3 to 20 kHz. The filter generates a phase distortion of the angle phi between the useful frequency 1200 Hz and 2200 Hz and an amplitude distortion of the factor beta between these two useful frequencies.

It is essential for this present disclosure that, due to the low modulation frequency of, for example, 20 to 40 kHz, the cut-off frequency must be very close to the useful frequency band. This possibly results in considerable phase shifts between the two carrier frequencies 1.2 and 2.2 kHz (see, for example, FIG. 12), while the transmitted signal amplitudes can be kept constant for both frequencies.

The use of a so-called Tchebychev filter of the second type, preferably with ripple in the stop band, is therefore advantageous for filtering, since especially low phase distortions in the useful frequency band between 1200 and 2200 Hz can be filtered with this type of filter. However, the implementation of this type of filter is possibly associated with a higher circuit complexity. Alternatively, filter characteristics of the Butterworth or Bessel type can also be used for around the price of somewhat higher phase distortions. In the case of a Bessel filter as analog transmission filter 210, for example, a higher filter order of, for example, third or fourth order is selected.

Figure 10:
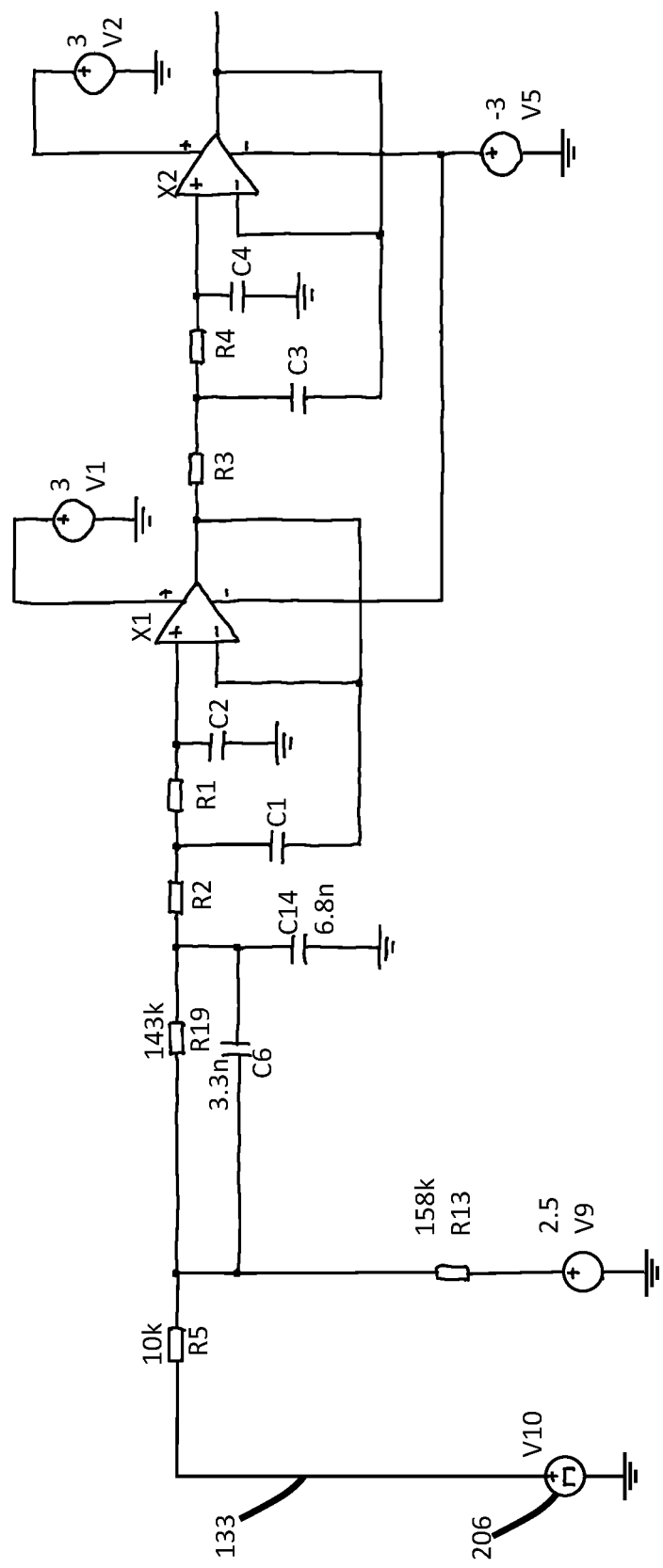
FIG. 10 shows an exemplary embodiment of an analog transmit filter for filtering a digital loop signal.

FIG. 10 shows an example of an analog transmit filter 210. In this case, the rectangular voltage source V10 describes the digital gate 206 supplied with the precise voltage reference 208. The analog transmit filter 210 for filtering the secondary signal SK generated by the pulse width modulator 108 comprises a pre-filter stage (shown in FIG. 10 by R5, R13, R19, C6 and C14) and a downstream fourth order filter (represented in FIG. 10 by X1 and X2 with R1, R2, C1, C2, R3, R4, C3, C4). The fourth order filter uses a Sallen Key circuit topology, which advantageously avoids a resistance-based direct current error at the output of the filter. This filter has a strong attenuation of the frequency components above 10 kHz (see FIG. 11).

Figure 11:
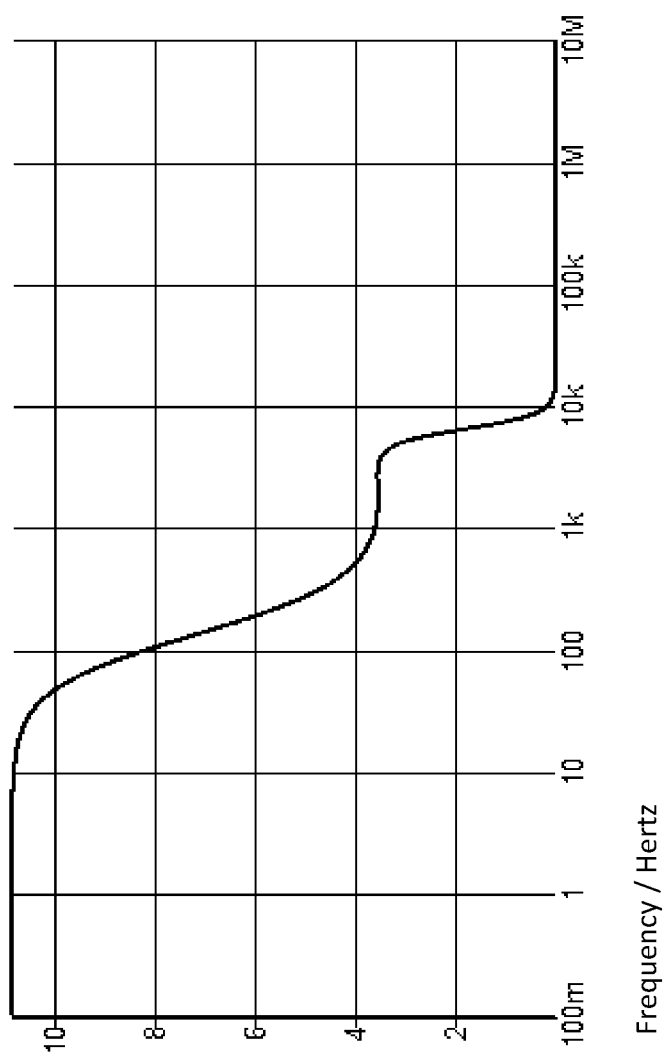
FIG. 11 shows a transmission characteristic of the analog transmit filter from FIG. 10.

FIG. 11 shows that, in the useful frequency range 1200 Hz to 2200 Hz, a plateau is formed, which has an attenuation by a factor of 3 in comparison with the direct current amplification and has a cut-off frequency in the range of approximately 6 kHz.

It can also be seen from FIG. 11 that the pre-filter stage (R5, R13, R19, C6 and C14) results in a low-pass with a cut-off frequency of approximately 100 Hz, which is thus approximately a factor of 10 smaller than the lowest carrier frequency (1200 Hz) used for the data transmission. Since this frequency separation for the pre-filter comprises more than 3 octaves, a virtually frequency-independent phase distortion results in the useful frequency band (1200 Hz, 2200 Hz) for this part of the filter. With the same attenuation of signals above approximately 6 kHz, a lower phase distortion in the useful signal band (1200 Hz to 2200 Hz) can be achieved with this filter topology (plateau filter) than would be possible with conventional low-pass filters.

Figure 12:
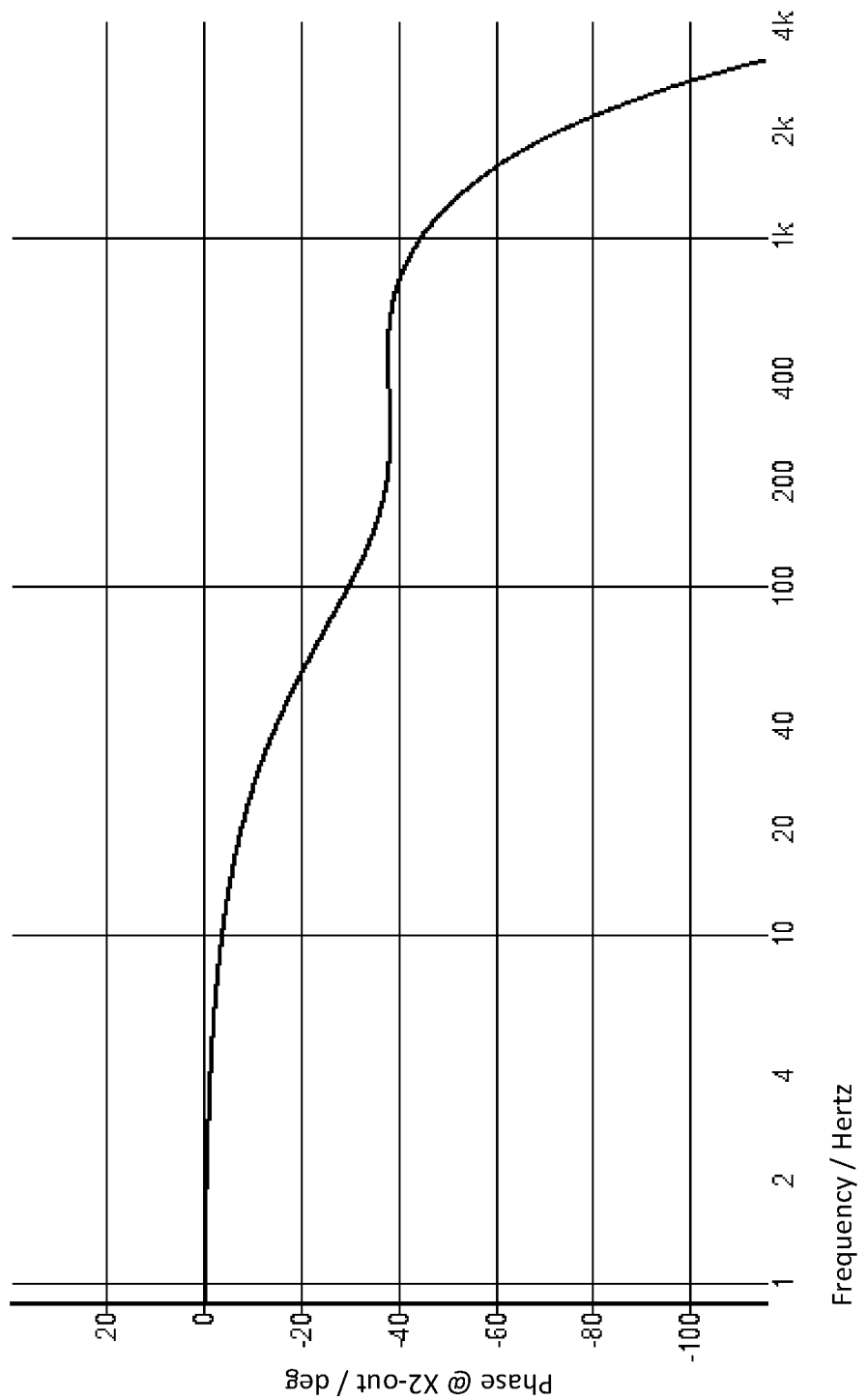
FIG. 12 shows a phase shift characteristic associated with the analog transmit filter of FIG. 10.

FIG. 12 shows by way of example a profile of a frequency-dependent phase shift. It can be seen that, as a result of the proximity to the cut-off frequency at approximately 6 kHz of the Sallen Key filter, the phase is distorted and, for example, a phase shift of approximately 45 degrees results, although a shallow profile in the useful frequency band (1200 Hz to 2200 Hz) results in the amplitude response (shown in FIG. 11).

Figure 13:
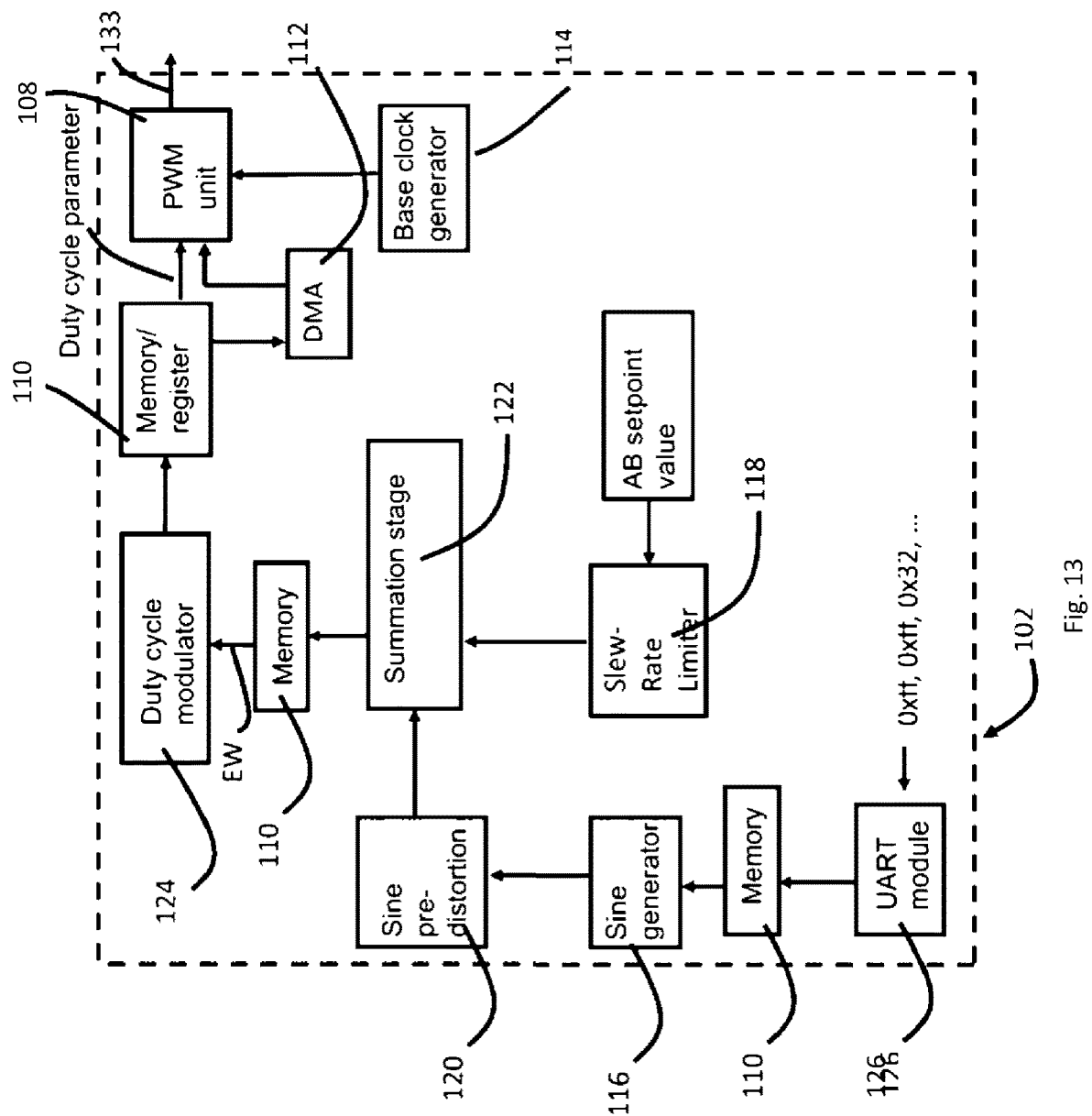
FIG. 13 shows a detailed schematic view of the path for the generation of a digital transmission signal by the computing unit of the fieldbus transmitter interface shown in FIG. 7.

FIG. 13 shows the interaction of the units arranged in the computing unit 102.

The parameterization of the pulse width modulator 108 preferably takes place with a low oversampling frequency. In particular, the parameterization is changed periodically with a frequency raster of 15 kHz to 200 kHz and is thus set by a duty cycle of the pulse width modulator 108 which varies over time in this grid.

The pulse width modulator 108 periodically triggers an interrupt of the processor 104 at frequency f, in which the parameterization of the duty cycle of the pulse width modulator 108 is changed to a new value. The frequency of the parameterization of the pulse width modulator 108 to a new duty cycle is advantageously selected as an integer multiple m of the baud rate of, for example, 1200 Hz, e.g. seventeen-fold or thirty-four-fold (f_PWM=I*baud rate). In order to be able to code both the frequency of 1200 Hz and 2200 Hz in the duty cycle of the pulse width modulator 108, at least approximately 8 support points are desirable per sine half-wave. That is to say, that in order to be able to adequately reproduce a sinusoidal signal at 2200 Hz, a lower reasonable minimum for the parameter m is the value of 1_min>=8*2200 Hz/1200 Hz=14.6.

For the coding of the FSK sine in the time progression of the duty cycle setpoint values, which are transmitted at the rate of f_PWM=I*baud rate to the pulse width modulator 108, the following procedure can be adopted: If the analog filter has a flat amplitude response in the useful frequency band between 1200 Hz and 2200 Hz, the requirement is to determine the associated phase value of the FSK sine for each of the duty cycle setpoint values and to calculate the duty cycle parameter as the sum of a DC base value and a sine component with the required FSK phase.

The change in the parameterization of the pulse width modulator 108, which thus takes place periodically, preferably ensues via a rounding process, which is implemented in a duty cycle modulator 124. For this purpose, the sine value obtained for the corresponding FSK phase, which is initially present in the form of a high-resolution digital value (for example 16 or 32 bits), is transferred into the rounded PWM duty cycle (e.g., corresponding to values of 0 ... 391).

Preferably, a so-called direct memory access controller 112 is used to modify the parameterization of the pulse width modulator 108, in order to thus save energy and to reduce the interrupt load in the microcontroller, that is to say in the computing unit 102.

A so-called multi-bit sigma-delta modulator is preferably used to implement the rounding method in the duty cycle modulator 124, in order thus to successfully realize a high noise suppression even at extraordinarily low oversampling rates. In particular, a multi-bit sigma-delta modulator of at least second order is used. The multi-bit sigma-delta modulator is preferably embodied with two-stage feedback of the output signal both to the input of the first modulator and to the input of the second modulator. This feature, especially, the two-stage feedback, advantageously reduces the time required for computing and increases the numerical stability of the algorithm.

Preferably, the rounding algorithm in the duty cycle modulator 124 at a first frequency=(I/2)*1200 Hz determines unrounded input values EW and subsequently, based on such unrounded input values EW, determines rounded PWM duty cycle parameterizations based on a second frequency of, for example, I*1200 Hz. A higher PWM frequency is thus advantageously achieved, without the sinusoidal determination possibly also having to be carried out at a correspondingly higher rate.

The method of a so-called sigma-delta modulation can also be interpreted as a rounding method. In this case, the higher resolution input value EW, for example 32 bits, is converted into a sequence of rounded output values, so that these correspond exactly to the unrounded input value EW after averaging over time. The most common application is that the rounded output value consists of a single bit, which to some extent corresponds to a maximum rough rounding. The principle is to form, within the sigma-delta modulator, the difference between the unrounded input value EW and the rounded output value and to integrate the deviation. The criterion drawn upon for the sequence of the rounded output values is that the integrated deviations should become zero.

The duty cycle modulator 124, a sigma-delta modulator in the example described herein, is operated with fewer rough roundings than "0" and "1," for example with integer output values between, e. g., 0 and N−1. In the case of a duty cycle parameterization of a pulse width modulator 108 having an overflow value N and a comparison value V=0 ... N−1, a sigma-delta modulator is thus used, for example, in order to calculate a value between 0 and N−1 from the input value EW.

A distinction is made between first, second and higher order sigma-delta modulators depending on the integrator method for determining the error to be minimized. While a deviation E1 between the rounded output value and the input value EW is integrated into first-order modulators, a second integration of the deviations E1 takes place in second order modulators. In higher order modulators, further integration stages are added.

FIG. 14 shows an example of a suitable rounding method according to the present disclosure. Important for the method is that it is embodied in a "stateful" manner, i.e. stateful and in one state, in the present case in one or more accumulator registers (Accu1, Accu2, Accu3), contains information about the rounded values output in the past. In the example shown in FIG. 14, Accu1 includes the integrated deviation between the rounded output value and the input value EW, and Accu2 includes the twofold or threefold integrated deviation.

The unrounded input value EW and such state are calculated together and on this basis a rounded output value is determined from which the duty cycle parameterization of the pulse width modulator 108 is determined. In the example of FIG. 14, the bottom 16 bit of the unrounded input variable are truncated.

The sigma-delta modulator implemented in FIG. 14 demonstrates the special feature that a direct feedback of the determined rounded value takes place not only into the first accumulator Accu1, but rather directly into the accumulator registers for the twofold and threefold integrated deviations Accu1, Accu2 as well (this is called "direct feedback"). This feature considerably increases the numerical stability and also reduces the settling time of the modulator.

Preferably, the rounding algorithm for a given unrounded input value EW is called up several times, for example twice. This results in rounded output values with the multiple frequency of the input signal.

A high-resolution input value EW, which is translated into the PWM duty cycle parameterization in the rounding method, is preferably calculated from an addition of two subcomponents, wherein the two subcomponents each represent one of the two direct current components DC (low-frequency analog signal) and alternating current components AC ("digital" FSK modulation signal at 1200 Hz and 2200 Hz) combined in the HART hybrid method.

However, the method can also be advantageously used when working with a constant direct current component DC, as occurs, for example, in the so-called HART multi-drop operating case. Even in the case of HART master implementations, the need for direct current adjustment is, as a rule, dispensed with. Alternatively, in the case of HART slave implementations, it is possible to pass the direct current parametrization to the current loop interface 101 in a way other than via the digital transmission signal 133.

If the current loop direct current signal is to be coded in the digital transmission signal 133, a temporal change rate of the direct current component DC is advantageously limited in a slew rate limiter 118 using a so-called slew rate limiter method, before the direct current voltage setpoint value is transmitted to the duty cycle modulator 124, which executes a rounding process. This limitation is done by the slew rate limiter 118. This can be done, for example, by limiting the maximum rate of change of the direct current component for two unrounded input values EW for the rounding process to a maximum value. The slew rate limiter 118 makes it possible to reduce the reactions to the digital HART useful data band, which are to be avoided according to the HART specification.

Preferably, by means of the method for driving the pulse width modulator 108 for the fieldbus transmitter interface 200, a phase distortion caused by the analog transmit filter 210 of the fieldbus transmitter interface is digitally precompensated during a pre-distortion of the alternating current voltage values AC or input values EW in the fieldbus transmitter interface 200. However, the phase-precompensation can optionally be dispensable, especially, if an analog filter with an inverse Tchebychev characteristic of the second type is used.

FIG. 13 shows that a sine generator 116 is used for the generation of a sinusoidal signal. A sine pre-distortion module 120 is used for sine pre-distortion. A summation stage 122 receives the pre-distorted sinusoidal signal and passes it to the duty cycle modulator 124 at the frequency (m*1200 Hz) or at the time interval t m=1/(m*1200 Hz) in the form of a new, unrounded target value. The duty cycle modulator 124 converts the rounding process into a PWM duty cycle parameterization. This can be done, for example, by the sine generator 116 storing in a register or a memory location 110 a phase value that is continuously increased (or alternatively reduced) for each of the m values per data bit as a function of the UART data signal. For example, if the FSK frequency of 2200 Hz is to be output for the duration of a UART data bit of 1200 baud, the phase value per time interval t_m must in each case be increased by the value of phi_2200=360 degrees*t_m*2200 Hz. However, if the frequency 1200 Hz is to be output on the current loop L for the duration of the data bit, the phase of the sine per time interval t_m only has to be increased by the value of phi_1200=360 degrees*t_m*1200 Hz. The resulting sequence of the m phase values per data bit can subsequently be used, for example, to extract a sine value corresponding to the phase from a pre-calculated table with sine values stored in the memory 110 via table access.

However, due to the phase distortion in the analog transmit filter 210, the output of the sinusoidal signal on the current loop does not take place with the calculated digital phase; rather, the analog phase shift has to be taken into account.

For sine pre-distortion, for example, a digital allpass filter can be used, which realizes a frequency-dependent phase shift when the amplitude response is unchanged. The digital allpass filter is dimensioned such that it just has the negative phase shift of the analog transmit filter 210 in the transmission path for the two useful frequencies (1200 and 2200 Hz) and thus compensates for this. However, such digital allpass filters may optionally require a rather high order and thus a rather high computing power, or a complex digital circuit.

Alternatively, it is possible to combine the sine generation and the phase-pre-distortion. This can be done, for example, in such a way that, with a transition from a 1 to a 0 data bit in a UART module 126, a corresponding change in frequency in the FSK signal during the temporal progression of the phase value the phase is in each case not increased by the values of phi 1200 and phi 2200.

Figure 15:
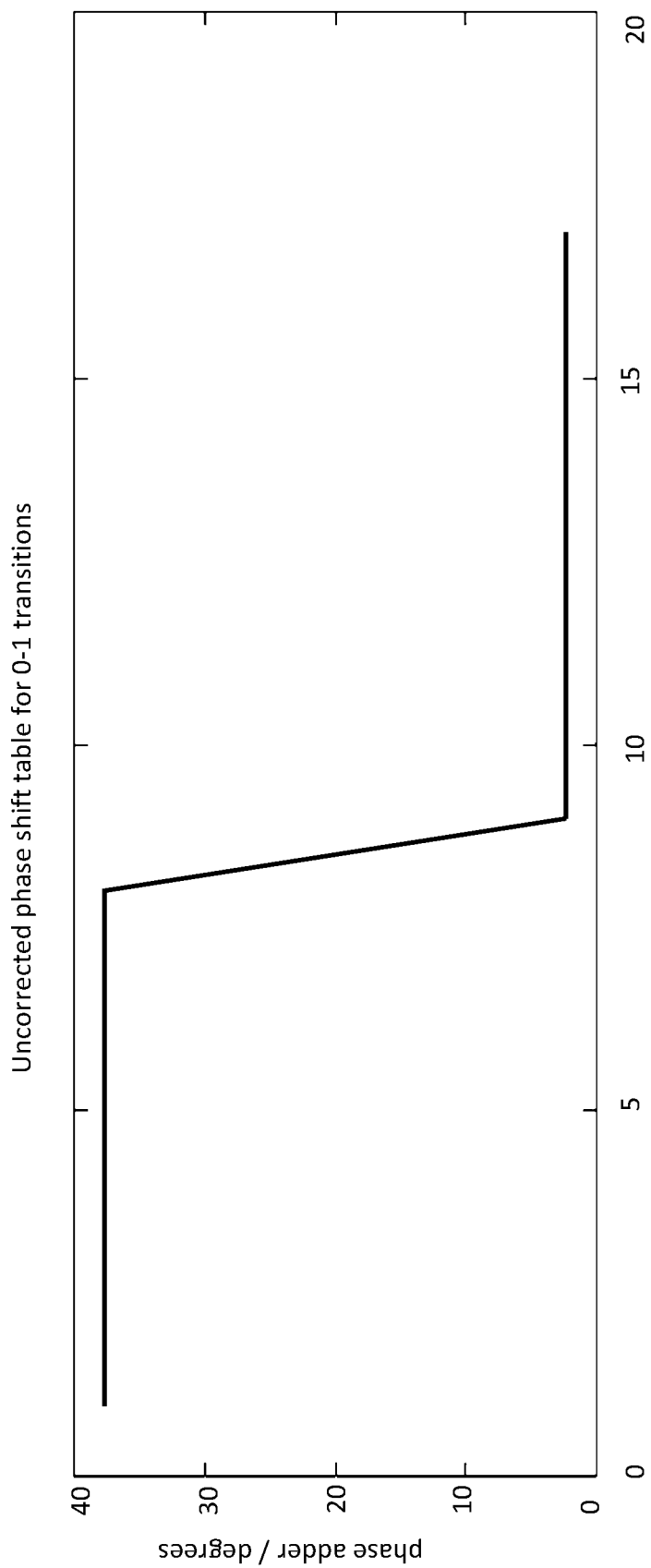
FIG. 15 shows the temporal progression of the phase increase values for m single steps at the transition from a frequency of 2200 Hz to a frequency of 1200 Hz, without compensation of the phase distortion of the analog filter.
Figure 16:
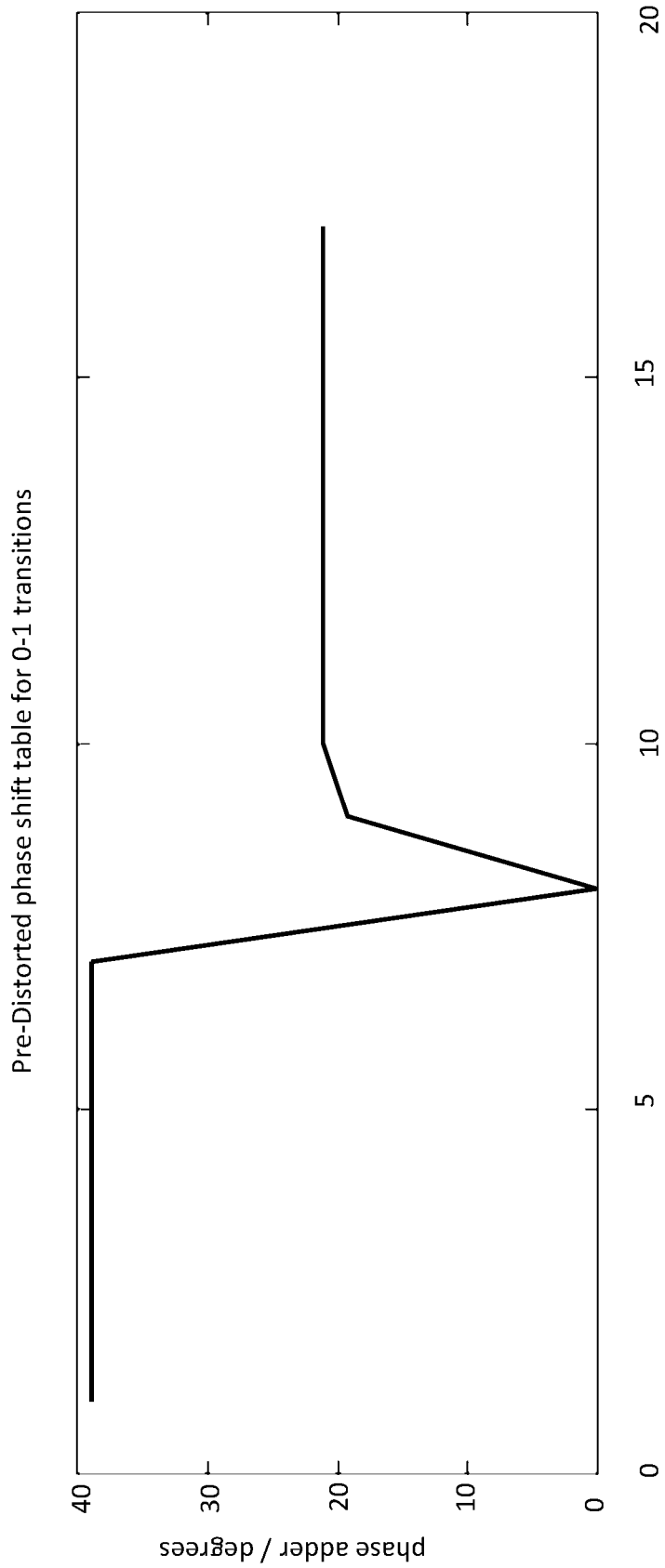
FIG. 16 shows the corresponding phase increase values taking into account the phase distortion of the analog filter from FIG. 12.

FIG. 15 shows a temporal progression of the phase addition values in the uncompensated case for a transition from 2200 Hz to 1200 Hz. With the time index #8 (not shown) the frequency is lowered to 1200 Hz. In contrast, FIG. 16 shows how, in the frequency conversion, the negative value of the phase shift of the analog transmit filter 210, of in this case approximately 40 degrees, is additionally taken into account.

Figure 17:
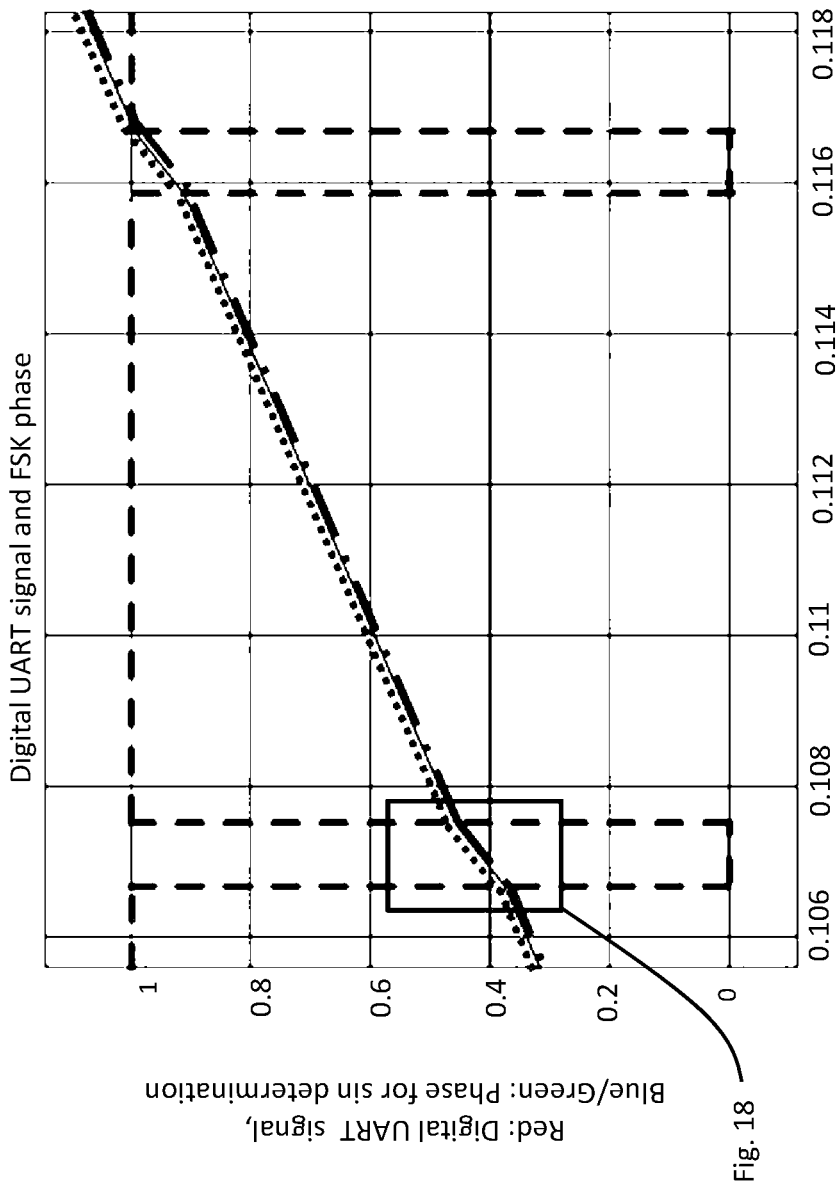
FIG. 17 shows the phase profile for generating a pre-distorted FSK transmission signal for a sequence of low and high bits.

FIG. 17 shows a temporally resulting phase profile. For a bit pattern with 0 and 1 bits, it can be seen that the phase is incremented more rapidly for the duration of the 0 level, which corresponds to a higher frequency of 2200 Hz. For the duration of a 1 bit, the time derivative of the phase angle or the slope is lower. The broken line shows the logic level (1.0) to be coded, or the FSK frequency (1200 Hz or 2200 Hz) to be output. The dash-dotted line shows the phase to be output without compensating for the frequency-dependent phase shift of the analog filter. The dotted line shows the phase to be output for a pre-distortion to compensate for a phase shift in the analog filter.

Figure 18:
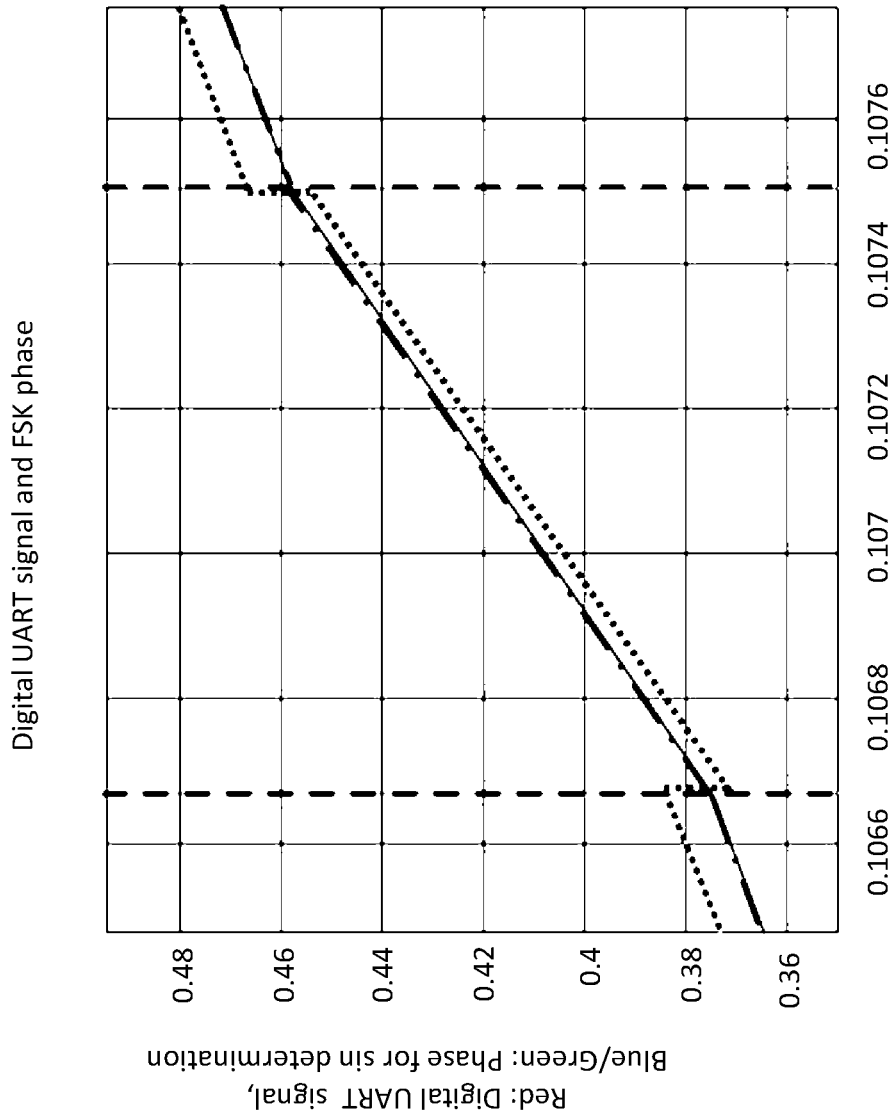
FIG. 18 shows a detailed view of FIG. 17.

FIG. 18 is a magnified representation of FIG. 17. In FIG. 18 it can be seen that, when the level changes from 0 to 1 and from 1 to 0, the phase does not increase continuously, but instead, at such points in time, the phase value is additionally modified by the phase shift in the analog filter, so that the correct points in time of the zero crossings of the sine wave result later at the output of the analog transmit filter 210. For example, in the event that all analog filter stages together shift a 2200 Hz signal by a phase of 50°, but a 1200 Hz signal only experiences a 22° shift, the phase value is increased during the generation of the 1200 Hz signals by 50°−22°=28°. That is to say, the pre-distortion takes place via the stages recognizable in FIG. 17 at the time of the level change.

Figure 19:
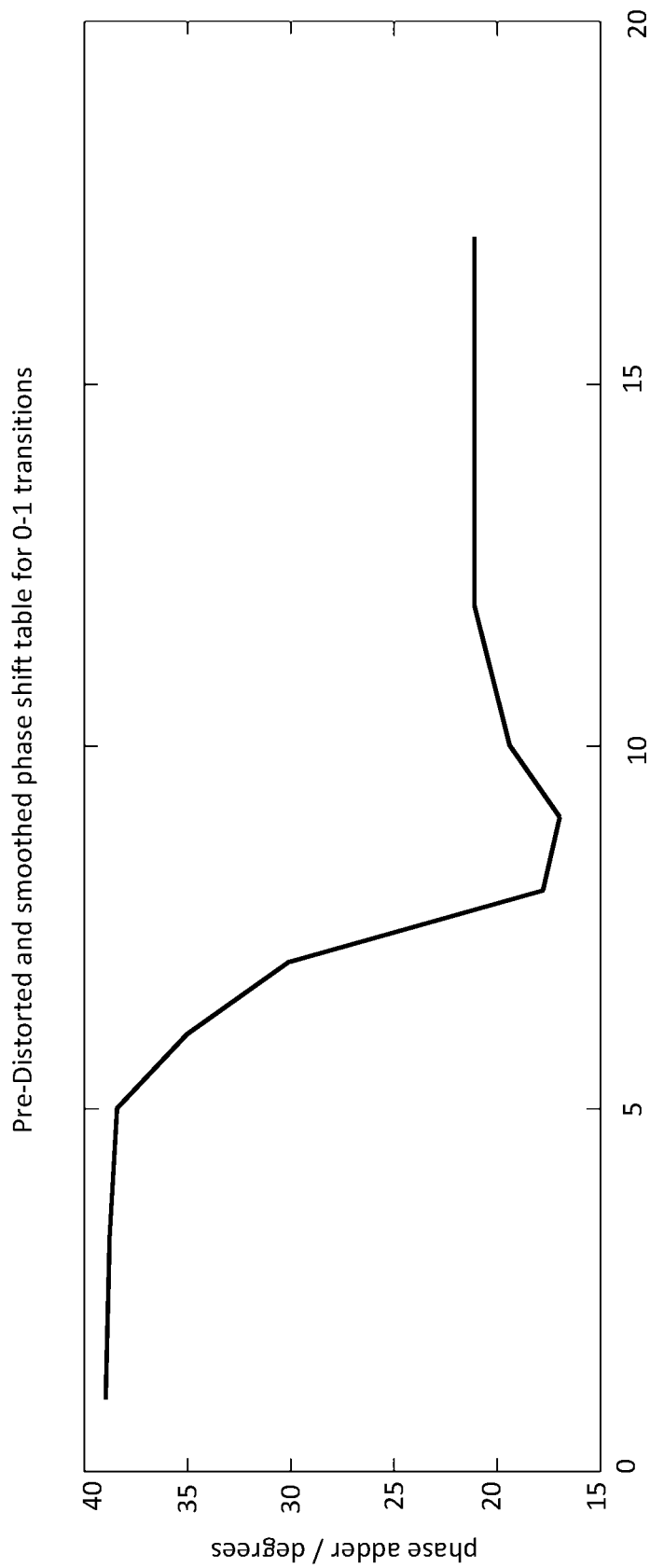
FIG. 19 shows a smoothed version of the phase curve of FIG. 16.

Advantageously, the phase distortion in this case cannot be converted into the temporal sequence of the m phase values per UART data bit in only one hard section; rather, it can be distributed to a plurality of phase values as outlined in FIG. 19. This can be done by calculating tables whose values have been smoothed via conventional digital smoothing filters for the phase addition values. The phase would then be further continuously increased without the respective addition values shown in FIG. 19 being changed abruptly.

For the frequency transition from 1200 Hz to 2200 Hz, the phase must accordingly be modified in the opposite direction, so that the phase distortion of the analog transmit filter 210 is added when switching back to the high frequency.

The method can be implemented, for example, in that optionally smoothed phase adding tables are stored in the memory 110 and such tables are accessed during the calculation of the increment values in the continuous sequence of phase values for a sine table lookup algorithm.

In an advantageous embodiment, the digital transmission signal 133 is provided to the pulse width modulator 108 in a transmission circuit via the first galvanic barrier 212. However, embodiments without a galvanic barrier are also conceivable.

In the method for FSK signal generation, the data bytes to be transmitted are therefore first converted into a UART data stream of a baud rate of, for example, 1200 BAUD, which essentially requires the consideration of stop bits, start bits, data bits and optionally parity bits. This is optionally stored in a register or memory 110. For each of the bits, m, for example m=17, phase values are now determined, which describe the phase profile of the FSK sinusoidal signal and may be stored in a memory 110.

Figure 20:
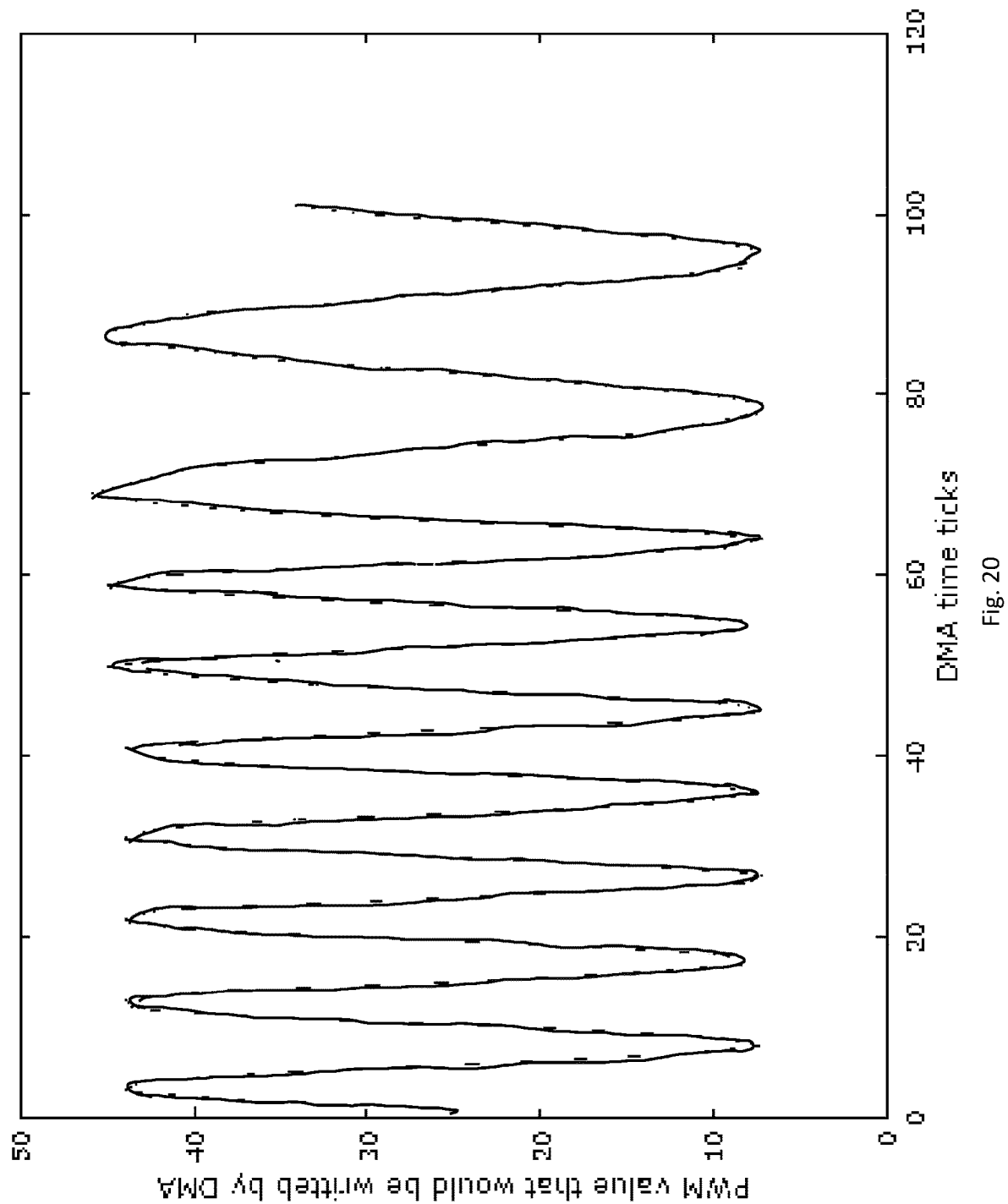
FIG. 20 shows an exemplary embodiment for a generated rounded PWM duty cycle parameterization.
Figure 21:
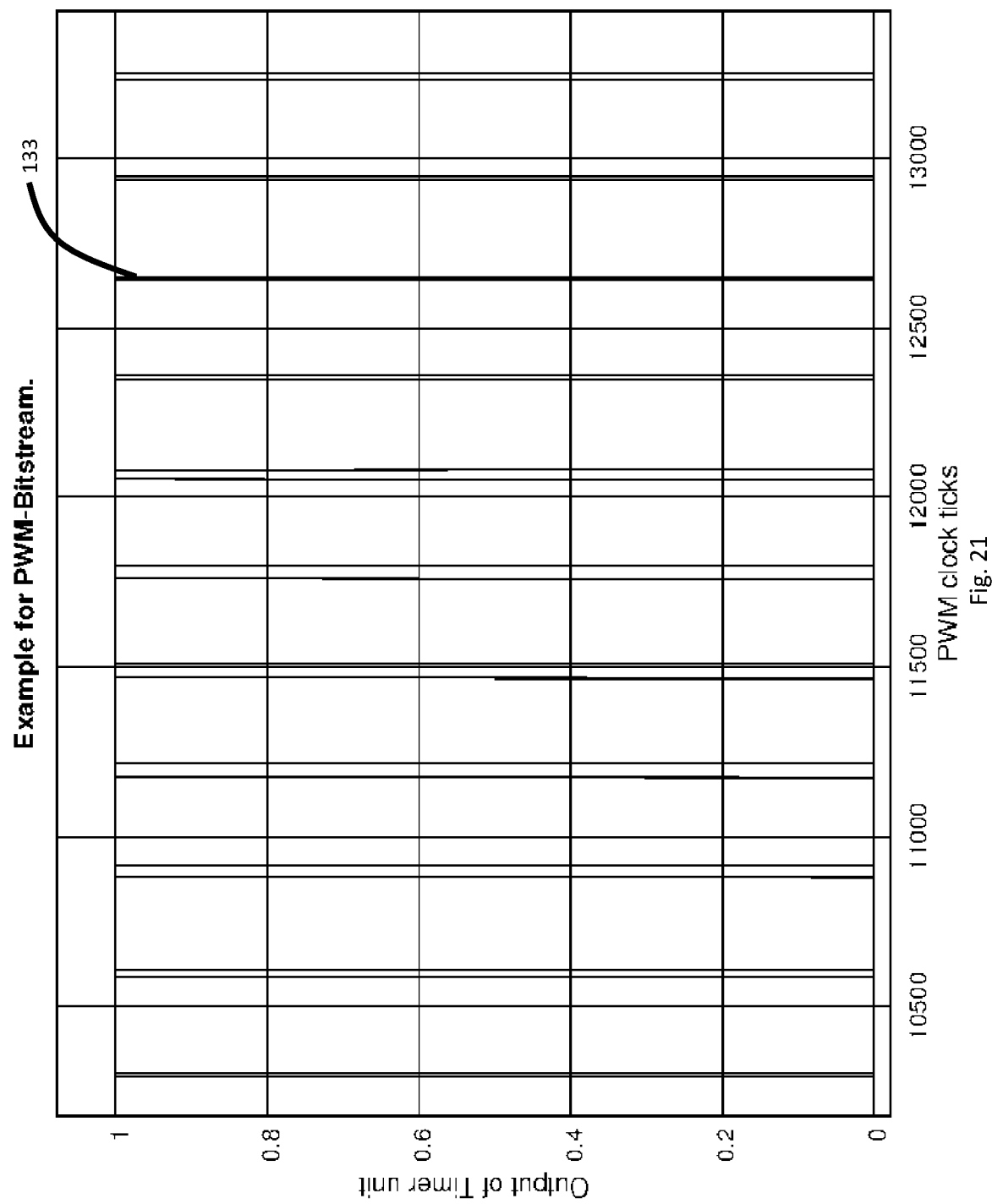
FIG. 21 shows the generated digital transmission signal associated with FIG. 20.

An unrounded sine setpoint value is then determined for each of the phase values, for example via a table stored in a memory 110. An (optionally slew rate limiter 118) unrounded direct current value or "DC" value is then optionally added to such unrounded sine value. Such unrounded result value is then forwarded to the duty cycle modulator 124 which implements the rounding method. An example of the temporal progression of the rounded values which parameterize the duty cycle is shown in FIG. 20. Periodically, l where l=(2*m) times per data bit, the pulse width modulator 108 is then configured with the new rounded duty cycle parameterization. At the output of the pulse width modulator 108 a 1-bit PWM signal, that is to say the digital transmission signal 133, with the base frequency I*BAUDRATE, is then obtained, whose duty cycle which varies over time reflects the temporal progression of the sinusoidal signal (secondary signal). Such a signal is shown in FIG. 21. The sinusoidal setpoint value thereby makes it possible for the amplitudes and phase distortions caused by the totality of all analog filters to be taken into account with within the framework of a pre-distortion in the sinusoidal setpoint value and thus compensated.

In the present example, the digital transmission signal 133 of the pulse-width modulator 108 thus contains a dominant interference frequency at the frequency I*BAUDRATE, for example 20.4 kHz. The Fourier transform of such a digital transmission signal 133 is shown by way of example in FIGS. 25 and 26. The carrier frequencies of the FSK modulation, i.e. the secondary signal SK, can be seen in FIG. 26 in the range of 1200 and 2200 Hz. Furthermore, in FIG. 25 can be seen the dominant interference frequency from the pulse width modulator 108 which is here 17*1200 Hz=20.4 kHz, which must be suppressed sufficiently strongly by the analog transmit filter 210.

Figure 25:
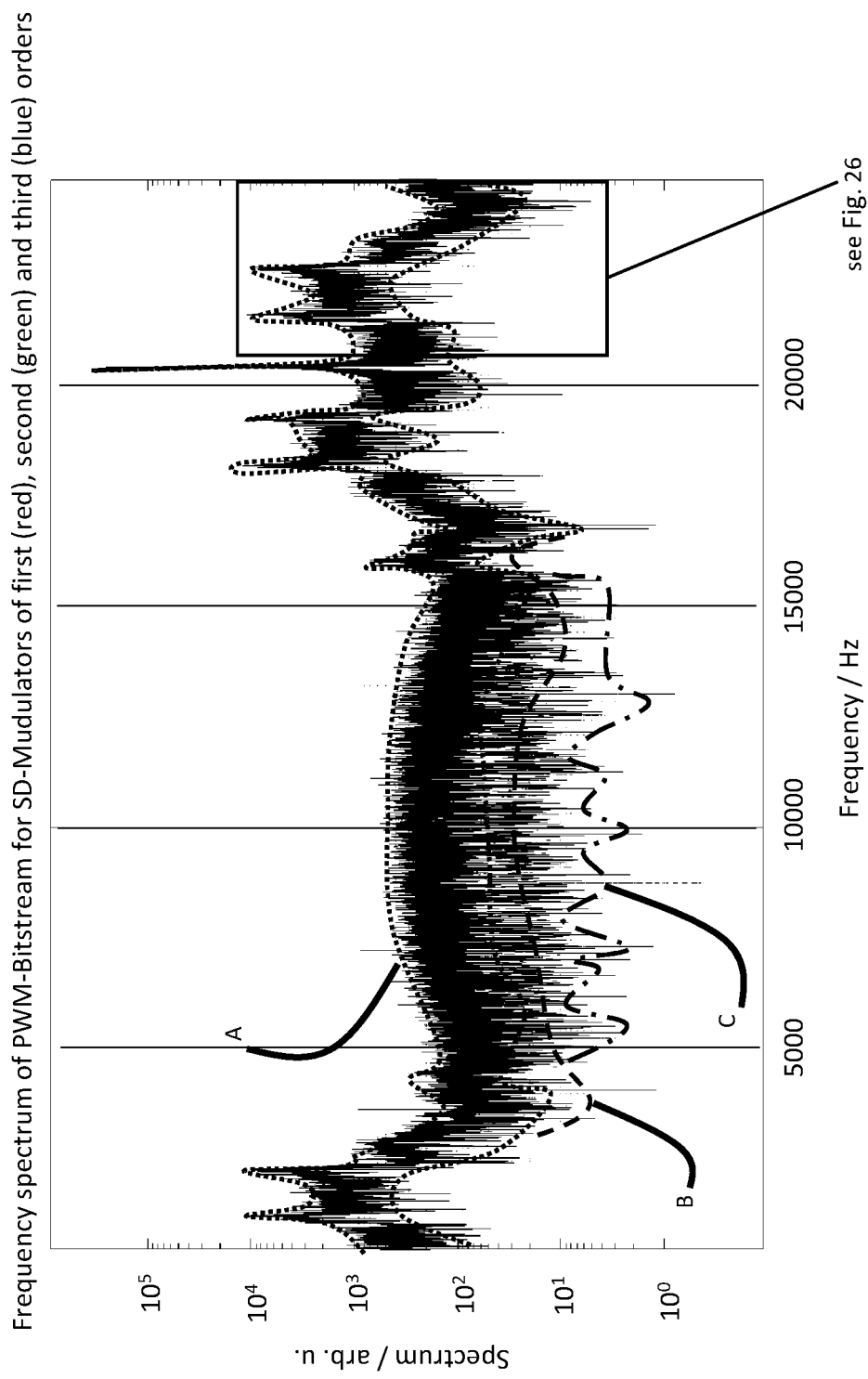
FIG. 25 shows the output spectrum of a digital transmission signal generated according to various rounding methods, as shown in FIG. 21.
Figure 26:
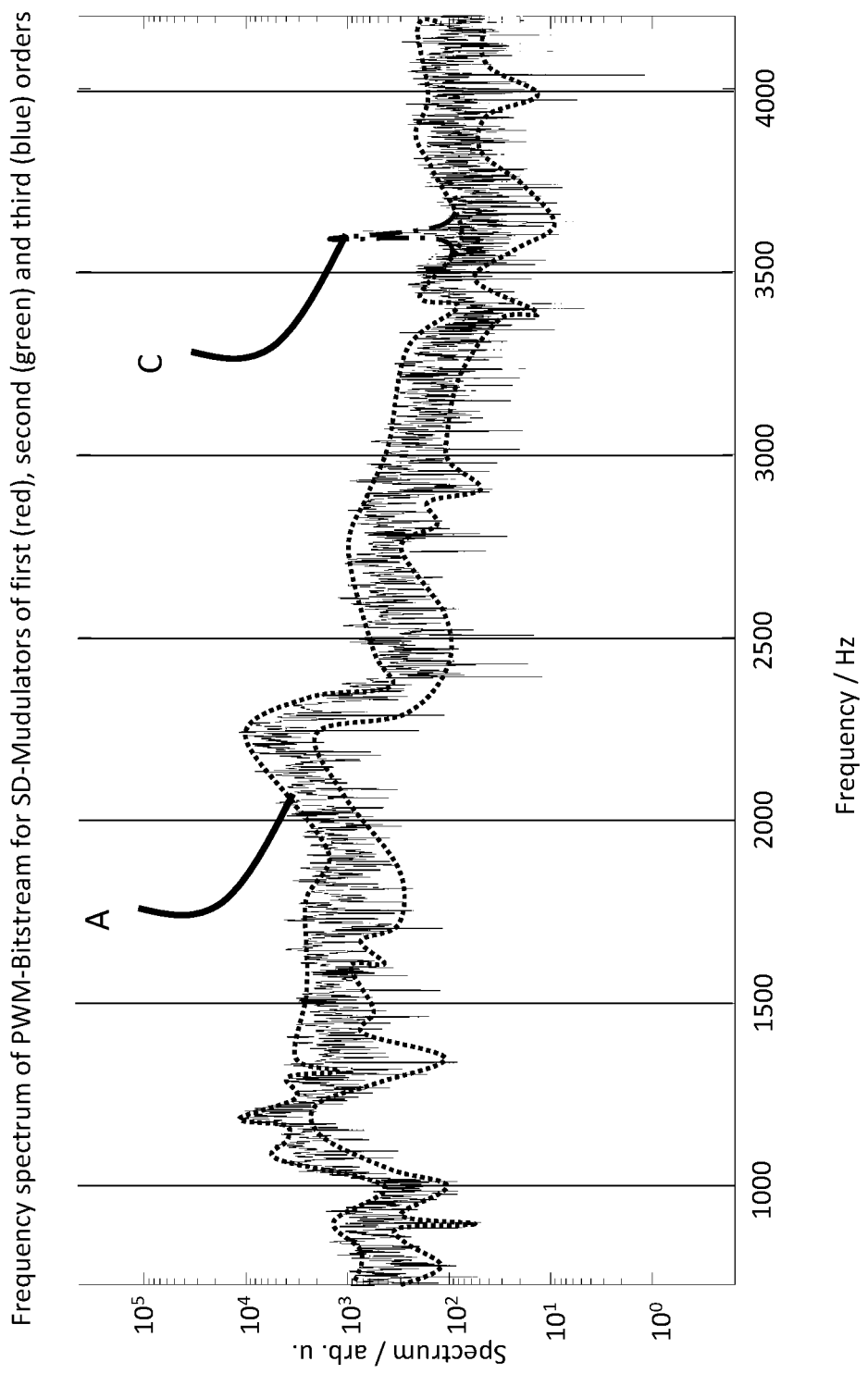
FIG. 26 shows a magnified section of the output spectrum shown in FIG. 25.

In this case, FIGS. 25 and 26 include characteristic curves for a first-order (the region C delimited by the dash-dotted line), second-order (the region B delimited by the dashed line) and third-order (the region A delimited by the dotted lines) sigma-delta modulator. It can be seen that the spectrum has approximately the same shape regardless of the order of the modulator. In FIG. 25, however, especially in the magnified section shown in FIG. 26, it can be seen that characteristic interfering frequencies, for example approximately 3600 Hz, occur in the case of the first-order modulator (see dash-dotted line C), which are suppressed in the case of the higher order modulators.

For this reason, it is advantageous to use a higher order modulator, especially, a second-order modulator.

With regard to the fieldbus receiver interface 300, it is proposed according to the present disclosure to replace the digital CIC filter of EP 2412135 B1 with a combination of the second analog pre-filter 308 and the analog digital converter 106 of the computing unit.

Figure 22:
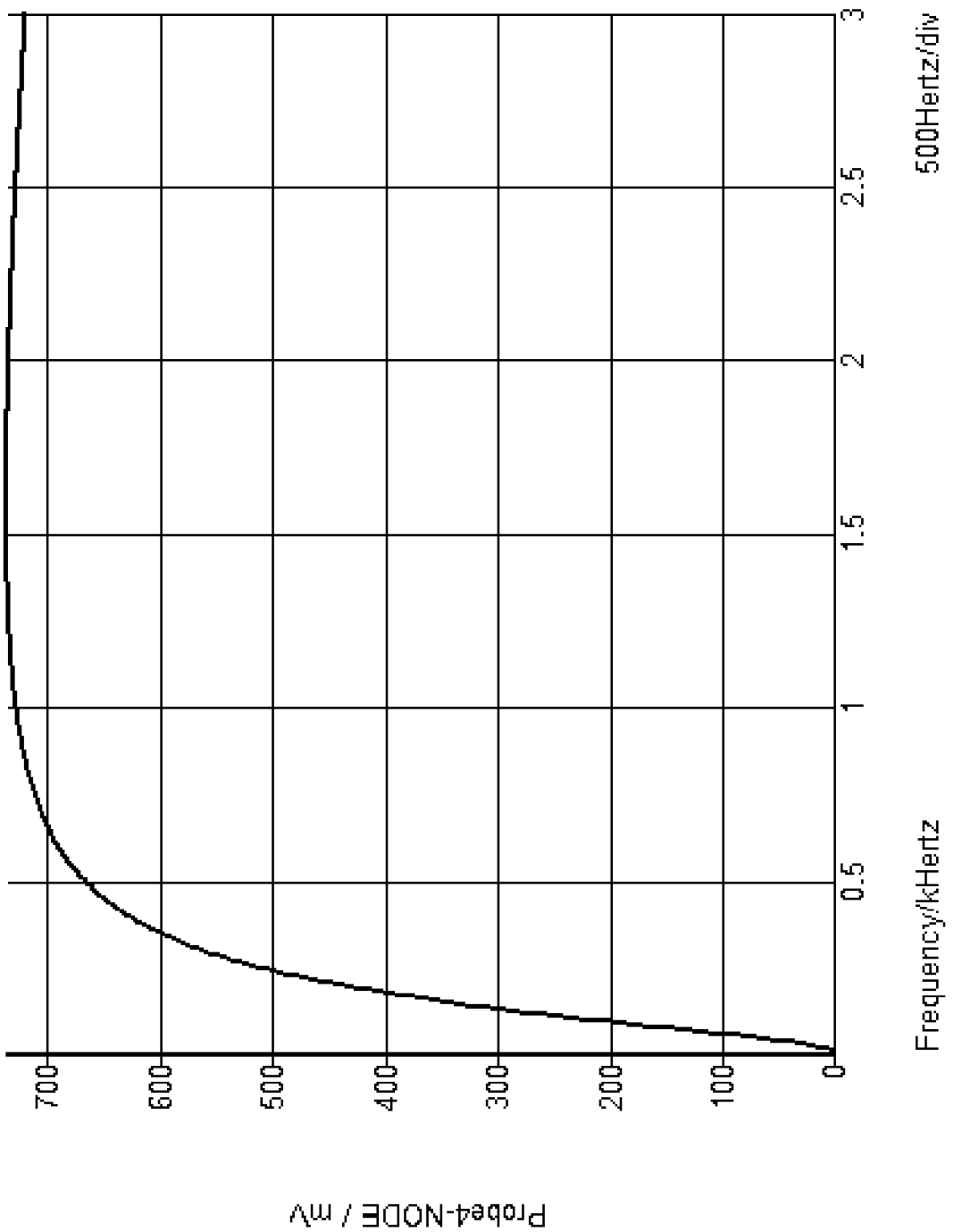
FIG. 22 shows a transmission function for an exemplary embodiment for the totality of the analog pre-filters for the FSK data reception illustrated in FIG. 8.

The second analog pre-filter 308 advantageously has a purely passive embodiment, i.e. without a semiconductor amplifier. FIG. 22 shows a possible transmission characteristic of the totality of the analog filters in the receive path. It is critical here that low-frequency interference frequencies of, for example, 29 Hz are strongly suppressed and the filter has an essentially flat amplitude response in the frequency range between 1200 Hz and 2200 Hz.

The analog-digital converter 106 is advantageously operated at a fixed conversion frequency, wherein the conversion frequency is advantageously an integer multiple "k" of the average value of the two FSK carrier frequencies:

$k*((1200\ Hz+2200\ Hz)/2)=1700\ Hz.$

The FSK received signal present at the current loop interface 101 is initially pre-filtered analogously with the aid of the first analog pre-filter 306. Frequency components <500 Hz, especially, are attenuated analogously strongly. The first analog pre-filter 306 is advantageously a purely passive analog filter and limits the amplitudes at the output to the modulation range suitable for the transmission link or second galvanic barrier 312 (in order, if applicable, to prevent oversteering even at high low-frequency interference amplitudes at the input).

The first analog pre-filter 306 makes it possible to adapt the signal levels, which were able to be achieved, for example, by low-frequency interference signals, well before the transmission to the signal transmission circuit, that is to say the second galvanic barrier 312 to be optionally overcome with respect to the modulation levels.

Subsequently, the pre-filtered received analog signal is transmitted to the second analog pre-filter 308 after the second galvanic barrier 312.

The combined transfer function of all filters 308 and 306 is then decisive for decoding the signals. An example of a transmission characteristic of the totality of the filters 306 and 308 along with the second galvanic barrier 312 is shown in FIG. 22. It has an essentially flat profile in the useful frequency band between 1200 and 2200 Hz and strongly attenuates high-frequency and low-frequency interference signals.

The use of a second galvanic barrier 312 in the area of signal transmission is generally optional and depends on the planned field of application, for example a potentially explosive area. In the case of a galvanically separated embodiment, the signal transmission can advantageously take place via the use of an analog "variable time sigma delta modulator" as described, inter alia, in US 20120020430 A1 (see FIG. 8, for example).

In the case of a galvanically coupled embodiment, a metallic conductor or simple electronic component (for example capacitors or resistors) can be used for transmitting the signals.

The transmitted signal is directed to the second analog pre-filter 308.

The output of the second analog pre-filter 308 is directed to the analog digital converter 106 in the computing unit 102.

Figure 23:
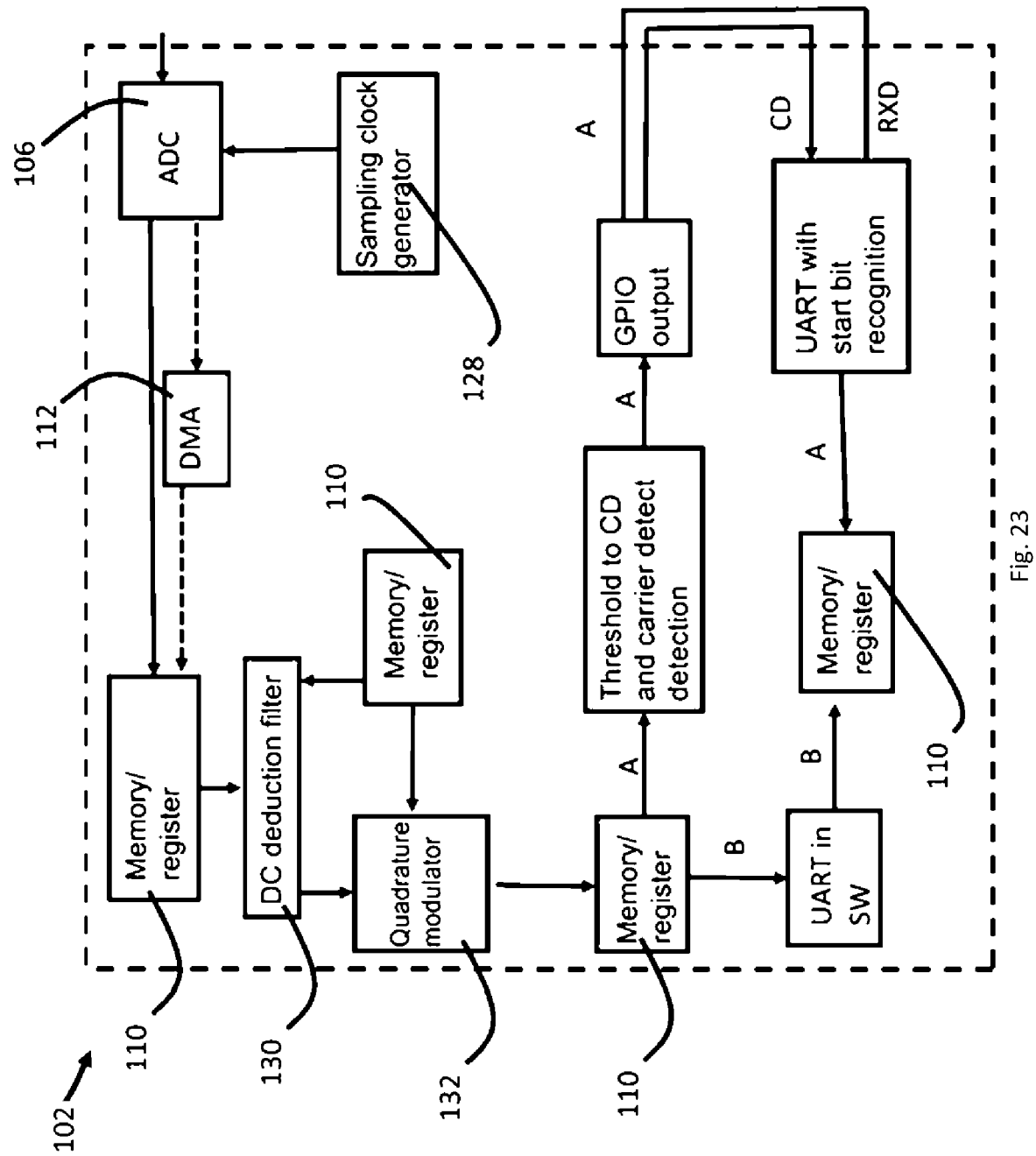
FIG. 23 shows a detailed view of the fieldbus receiver interface.

FIG. 23 shows the design of the computing unit 102 in detail.

The analog digital conversion takes place via a sampling clock generator 128 and advantageously takes place at a multiple k of the center frequency between the FSK carrier frequencies, i.e. at 1200 Hz and 2200 Hz a multiple of 1700 Hz, especially, four times 6800 Hz. It should be noted at this point that the frequency of the clock generator 128 for reception, that is to say for the fieldbus receiver interface 300, can be selected independently of the clock generators for transmission, that is to say for the fieldbus transmitter interface 200.

The result of the ADC conversion is stored in the memory 110 or register, respectively. The primary signal is thereby present in the memory 110 in digitized form. Optionally, this storing is performed using the DMA controller 112 (indicated by a dashed arrow in FIG. 23). The direct memory access controller 112 reduces the interrupt rate in the CPU, that is to say in the computing unit 102, and thus the power demand.

With an analog-digital converter 106 with 12-bit resolution and digitized values between e.g. 0 and 4095, a value sequence then results with a certain direct current component of, for example, 2030 and a time-variable component containing information about the FSK signal.

The design of the direct current deduction filter 130, which not only has to perform a simple direct current deduction (e.g., subtraction of 2030) but should also advantageously suppress low-frequency components of, for example, 29 Hz, is very important for the function of the reception-side decoding method.

An exponential filter with a state register s, which describes the respective direct current interference component to be deducted, and a filter parameter alpha are advantageously used for determining the direct current interference component to be deducted. In the case of a new ADC value x, the new direct current interference component is then calculated, for example, via the relationship s_new= (1−alpha)*s_alt+alpha*x. The use of a parameter alpha=0.5 is particularly advantageous. In this case, only one shift operation and no multiplication is required, and the filter suppresses low-frequency signal components in the receive path quite efficiently, without causing a high phase distortion in the useful band between 1200 Hz and 2200 Hz.

Figure 24:
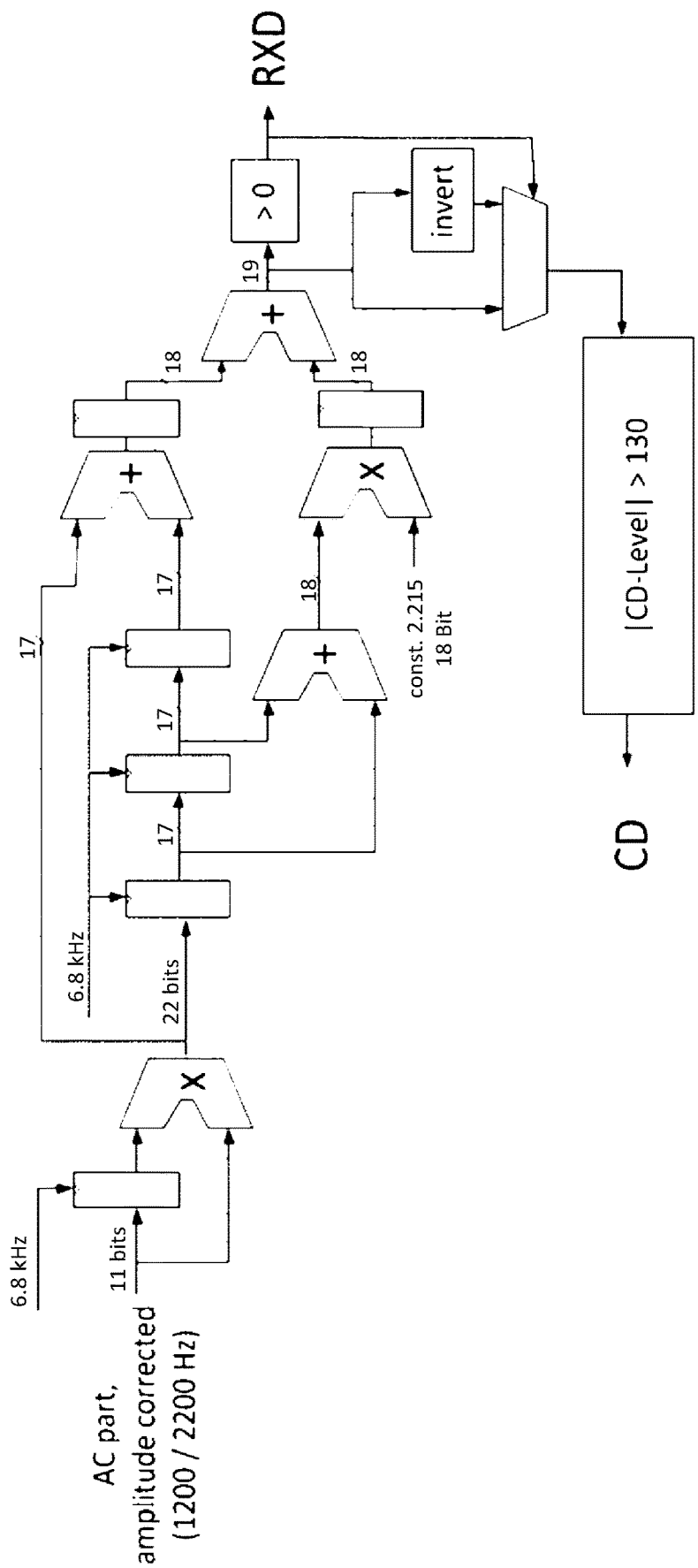
FIG. 24 shows an exemplary embodiment for a quadrature demodulator filter according to the present disclosure for HART data reception.

In the method according to the present disclosure, the output variable of the direct current deduction filter 130 is directed to a quadrature demodulator 132, as shown, for example, in FIG. 24.

This quadrature demodulator 132 provides a signed output value at a rate of, for example, 6800 Hz as a result of the calculation method. The magnitude of the output value can be used to detect a received carrier signal, while the sign describes the temporal progression of the decoded UART received signal RXD (again with stop bit, start bit, data bits, parity bits, etc.). The sign of the output of the quadrature demodulator 132 and the carrier detect signal detected via the level can, for example, be led out of the computing unit 102 via a so-called GPIO pin and connected to UART receive hardware. The quadrature demodulator 132 is preferably implemented as a software algorithm. The quadrature demodulator 132 enables the decoding of the HART useful signals.

Alternatively, in the method, the UART RXD signal is processed within the computing unit 102 without the corresponding signals being led out externally (path B in FIG. 23).

In any case, the data byte received by the remote station is decoded and processed further from the temporal progression of the RXD line with baud rate 1200 Hz.

However, the advantages of the present disclosure can also be applied to a remote station assuming the HART master role.

An advantage of the fieldbus interface 100 according to the present disclosure compared to HART modem solutions is that the circuit complexity of the fieldbus interface 100 is reduced and thus also the costs of the fieldbus interface 100 and the energy consumption of the fieldbus interface 100. In particular, the fieldbus interface 100 according to the present disclosure also allows a particularly simple, galvanically separate transmission of HART fieldbus signals thanks to the first and second galvanic barriers 212, 312.

Compared to the prior art of EP 2412135 B1, the present disclosure also allows use in applications in which no use of FPGAs or powerful digital circuits and thus high oversampling rates is permitted due to a maximum prescribed energy requirement.

The solution according to the present disclosure codes the analog FSK transmission signal, i.e. the analog loop signal AS, in a single digital signal line in each case. Compared with solutions which output the FSK signal, that is to say the analog loop signal AS, in a microcontroller, that is to say the computing unit 102, on a plurality of digital or an analog line (using a digital-analog converter), the method according to the present disclosure offers the advantage of a considerably reduced power requirement.

The invention claimed is:

1. A fieldbus transmitter interface for a field device or a control center, the fieldbus transmitter interface comprising:
   a computing unit;
   a digital gate;
   an analog transmission filter; and
   a transmitter interface output,
   wherein the digital gate is connected to the analog transmission filter and the analog transmission filter is connected to the transmitter interface output,
   wherein the computing unit includes a pulse width modulator and a pulse width modulator clock that is suitable for generating a secondary signal that is coded by means of a duty cycle that is varied over time by the pulse width modulator clock, and wherein the pulse width modulator is suitable for superimposing the secondary signal with a carrier signal so that a digital transmission signal with a frequency of less than 150 kHz is generated,
   wherein the digital gate and the analog transmission filter are suitable for converting the digital transmission signal into an analog loop signal, and
   wherein the transmitter interface output is suitable for being connected to a remote station for transmitting the analog loop signal to the remote station.

2. The fieldbus transmitter interface according to claim 1, further comprising:
   a first galvanic barrier arranged between the computing unit and the analog transmission filter.

3. The fieldbus transmitter interface according to claim 1, wherein the computing unit includes a duty cycle modulator for rounding an input value wherein the duty cycle modulator is suitable for converting the input value into duty cycle setpoint values rounded for respective periods of the digital transmission signal and for transmitting the rounded duty cycle setpoint values to the pulse width modulator.

4. The fieldbus transmitter interface according to claim 3, wherein the duty cycle modulator is a multi-bit sigma-delta modulator.

5. The fieldbus transmitter interface according to claim 3, wherein the computing unit determines an unrounded input value for the duty cycle modulator based on a direct current voltage setpoint value and a sine setpoint value.

6. The fieldbus transmitter interface according to claim 5, wherein the computing unit further includes a slew rate limiter suitable for limiting a change in the direct current voltage setpoint value.

7. The fieldbus transmitter interface according to claim 1, wherein the pulse-width modulator codes the secondary signal at a baud rate of 1200 Hz, wherein the period duration of the secondary signal is constant and the frequency of the digital transmission signal is an integer multiple of the baud rate.

8. The fieldbus transmitter interface according to claim 1, wherein the computing unit further includes a sine pre-distortion filter suitable for realizing a frequency-dependent phase shift of the digital transmission signal to compensate a phase shift of the analog transmission filter.

9. The fieldbus transmitter interface according to claim 1, wherein the computing unit further includes a sine generator suitable for outputting a sine value from a phase input value and forwarding it to a duty cycle modulator so that the sine value includes a pre-distortions suitable for compensating for a predetermined frequency-dependent phase shift of the analog transmission filter.

10. The fieldbus transmitter interface according to claim 1, wherein the computing unit further includes a memory and a direct memory access controller,
    wherein a duty cycle sequence is stored in the memory, and the direct memory access controller is suitable for controlling the pulse width modulator with the duty cycle sequence such that it adjusts the duty cycle as a function of the duty cycle sequence.

11. The fieldbus transmitter interface according to claim 1, wherein the analog transmission filter is at least third order, is optimized for low phase shift in a useful frequency band, and has a Bessel or Butterworth characteristic or a plateau characteristic.

12. A fieldbus receiver interface for processing a primary signal, comprising:
    a receiver interface input;
    a first analog pre-filter;
    a second analog pre-filter; and a computing unit including an analog digital converter, a direct current deduction filter, and a quadrature demodulator.

13. The fieldbus receiver interface according to claim 12, further comprising:
a galvanic barrier arranged between the receiver interface input and the computing unit and arranged between the first analog pre-filter and the second analog pre-filter.

14. The fieldbus receiver interface according to claim 13, wherein the transmission of the primary signal takes place with digital coding via the galvanic barrier.

15. The fieldbus receiver interface according to claim 12, wherein an analog sigma-delta modulator is used for converting an output signal of the second analog pre-filter.

16. The fieldbus receiver interface according to claim 12, wherein the primary signal to be processed contains two carrier frequencies, and the analog-digital converter is controlled by a clock generator with an integer multiple of a center frequency of the two carrier frequencies.

17. A fieldbus interface, comprising:
a fieldbus transmitter interface, including:
a computing unit;
a digital gate;
an analog transmission filter;
and a transmitter interface output,
wherein the digital gate is connected to the analog transmission filter and the analog transmission filter is connected to the transmitter interface output,
wherein the computing unit includes a pulse width modulator and a pulse width modulator clock that is suitable for generating a secondary signal that is coded by means of a duty cycle that is varied over time by the pulse width modulator clock, and
wherein the pulse width modulator is suitable for superimposing the secondary signal with a carrier signal so that a digital transmission signal with a frequency of less than 150 kHz is generated,
wherein the digital gate and the analog transmission filter are suitable for converting the digital transmission signal into an analog loop signal, and
wherein the transmitter interface output is suitable for being connected to a remote station for transmitting the analog loop signal to the remote station; and
a fieldbus receiver interface, including:
a receiver interface input;
a first analog pre-filter;
a second analog pre-filter; and
a computing unit including an analog digital converter, a direct current deduction filter, and a quadrature demodulator.

18. A system, comprising:
a fieldbus transmitter interface, including:
a computing unit;
a digital gate;
an analog transmission filter;
and a transmitter interface output,
wherein the digital gate is connected to the analog transmission filter and the analog transmission filter is connected to the transmitter interface output,
wherein the computing unit includes a pulse width modulator and a pulse width modulator clock that is suitable for generating a secondary signal that is coded by means of a duty cycle that is varied over time by the pulse width modulator clock, and
wherein the pulse width modulator is suitable for superimposing the secondary signal with a carrier signal so that a digital transmission signal with a frequency of less than 150 kHz is generated,
wherein the digital gate and the analog transmission filter are suitable for converting the digital transmission signal into an analog loop signal, and
wherein the transmitter interface output is suitable for being connected to a remote station for transmitting the analog loop signal to the remote station; and
a fieldbus receiver interface, including:
a receiver interface input;
a first analog pre-filter;
a second analog pre-filter; and
a computing unit including an analog digital converter, a direct current deduction filter, and a quadrature demodulator,
wherein the fieldbus transmitter interface and the fieldbus receiver interface are interconnected via a current loop.

19. A coding method for a fieldbus transmitter interface of a field device or of a control center, comprising:
providing a fieldbus transmitter interface, including:
a computing unit;
a digital gate;
an analog transmission filter;
and a transmitter interface output,
wherein the digital gate is connected to the analog transmission filter and the analog transmission filter is connected to the transmitter interface output,
wherein the computing unit includes a pulse width modulator and a pulse width modulator clock that is suitable for generating a secondary signal that is coded by means of a duty cycle that is varied over time by the pulse width modulator clock, and
wherein the pulse width modulator is suitable for superimposing the secondary signal with a carrier signal so that a digital transmission signal with a frequency of less than 150 kHz is generated,
wherein the digital gate and the analog transmission filter are suitable for converting the digital transmission signal into an analog loop signal, and
wherein the transmitter interface output is suitable for being connected to a remote station for transmitting the analog loop signal to the remote station;
generating a digital representation of the secondary signal as a duty cycle sequence by the computing unit;
transmitting the digital representation of the secondary signal to the pulse-width modulator;
converting the digital representation of the secondary signal by the pulse width modulator into a digital transmitter signal having a duty cycle that varies over time and having a frequency of less than 150 kHz;
generating an analog loop signal by a digital gate based on the digital signal; and
providing the analog loop signal at the transmitter interface output.

20. The coding method according to claim 19, wherein in order to generate the duty cycle sequence a multi-bit sigma delta modulator is used.

21. The coding method according to claim 19, wherein a frequency-dependent pre-distortion of the phase of the digital transmission signal occurs when the duty cycle sequence is generated.

* * * * *